(12) United States Patent
Kinoshita et al.

(10) Patent No.: US 7,927,777 B2
(45) Date of Patent: Apr. 19, 2011

(54) METHOD FOR PRODUCING RESINOUS PARTICLES

(75) Inventors: Naotoshi Kinoshita, Numazu (JP); Tetsuya Tanaka, Shizuoka (JP); Masahiro Kawamoto, Shizuoka (JP)

(73) Assignee: Ricoh Company, Ltd., Tokyo (JP)

( * ) Notice: Subject to any disclaimer, the term of this patent is extended or adjusted under 35 U.S.C. 154(b) by 601 days.

(21) Appl. No.: 12/036,658

(22) Filed: Feb. 25, 2008

(65) Prior Publication Data

US 2008/0305421 A1  Dec. 11, 2008

(30) Foreign Application Priority Data

Feb. 26, 2007  (JP) .................................. 2007-045691

(51) Int. Cl.
*G03G 9/08* (2006.01)
(52) U.S. Cl. .................................................... 430/137.1
(58) Field of Classification Search ................. 430/137.1
See application file for complete search history.

(56) References Cited

U.S. PATENT DOCUMENTS

| | | | |
|---|---|---|---|
| 6,568,536 | B2 | 5/2003 | Tanaka et al. |
| 2001/0031414 | A1* | 10/2001 | Yoshida et al. ............ 430/108.3 |
| 2003/0022088 | A1 | 1/2003 | Semura et al. |
| 2003/0178514 | A1 | 9/2003 | Makino et al. |
| 2006/0024607 | A1 | 2/2006 | Tanaka et al. |
| 2006/0046176 | A1 | 3/2006 | Hidaka |

FOREIGN PATENT DOCUMENTS

| | | | |
|---|---|---|---|
| EP | 1 920 825 A1 | | 5/2008 |
| JP | 56013945 | * | 4/1981 |
| JP | 2001-106917 | | 4/2001 |
| JP | 2002-91073 | | 3/2002 |
| JP | 3368024 | | 11/2002 |
| JP | 2002-351143 | | 12/2002 |
| JP | 3409100 | | 3/2003 |

(Continued)

OTHER PUBLICATIONS

Abstract of JP-B-56-13945.*
Machine English langauge translation of JP 2004-332130, Nov. 25, 2004.*

*Primary Examiner* — Hoa V Le
(74) *Attorney, Agent, or Firm* — Oblon, Spivak, McClelland, Maier & Neustadt, L.L.P.

(57) ABSTRACT

There is provided a method for producing resinous particles, containing: melting a mixture containing a binder resin and at least one additive having a melting point lower than T1/2 of the binder resin so as to prepare a molten material; atomizing resinous particles from the molten material in an atmosphere having a temperature higher than Tg of the binder resin and lower than 3 times of T1/2 of the binder resin; retaining the resinous particles in an atmosphere having a temperature higher than Tg of the binder resin, and lower than 1.5 times of T1/2 of the binder resin for 1 s to 15 s; and cooling and solidifying the resinous particles. There is also provided a method for producing resinous particles containing: melting the mixture so as to prepare a molten material; increasing a specific surface of the molten material in an atmosphere having a temperature higher than Tg of the binder resin, and lower than 3 times of T1/2 of the binder resin, so as to form a precursor; retaining the precursor in an atmosphere having a temperature higher than Tg of the binder resin, and lower than 1.5 times of T1/2 of the binder resin for 1 ms to 10 ms; cooling and solidifying the precursor; and atomizing resinous particles from the precursor.

15 Claims, 15 Drawing Sheets

FOREIGN PATENT DOCUMENTS

| | | |
|---|---|---|
| JP | 2004-117551 | 4/2004 |
| JP | 2004-189845 | 7/2004 |
| JP | 2004-332130 | 11/2004 |
| JP | 2005-187773 | 7/2005 |
| JP | 2005-258394 | 9/2005 |
| JP | 2006-285198 | 10/2006 |

* cited by examiner

METHOD FOR PRODUCING RESINOUS PARTICLES

BACKGROUND OF THE INVENTION

1. Field of the Invention

The present invention relates to a method for producing resinous particles, a precursor, resinous particles, a toner, a developer, a toner container, a process cartridge, an image forming method, and an image forming apparatus.

2. Description of the Related Art

Among the conventional methods for producing a toner, a pulverization method is a method for producing a toner by kneading toner materials containing a binder resin, a coloring agent such as a pigment, wax and the like, finely dispersing the wax in the binder resin, and then pulverizing. The toner produced in the pulverization method may be referred as a pulverization toner, hereinafter. The pulverization toner generally has the wax content of only 3% by weight to 6% by weight due to the production process thereof and handling of the toner.

On the other hand, a chemical method, which uses aggregations or the like, is a method for producing a toner encapsulating wax by using the characteristics such that particles are built up to form the toner. The toner produced in the chemical method is referred as a chemical toner, hereinafter. The chemical toner is capable of encapsulating a large amount (e.g. 10% by weight or more) of the wax compared to the pulverization toner, does not require the application of oil on a fixing roller and the like, and is suitable for an oil-free toner which enables a low temperature fixing. It has been known a technology of the chemical toner which maintains the offset temperature high and improves the low temperature fixing property by dispersing the fine particles of the wax in an area adjacent to the surface of the toner.

The pulverization method requires a lot of know-how for controlling the dispersion state of the wax, and the control thereof is not easy. Related to the fixing performance, it is not preferable that the dispersion state of the wax is entirely even, and the dispersion state of the wax requires being uneven at a certain degree so that the toner has a wide range of an appropriate fixing temperature, namely a large deference between the temperature range of the low temperature offset and the temperature range of high temperature offset. Specifically, the condition where the wax is finely dispersed in the binder resin is more preferable than the condition where the wax is compatible with the binder resin. However, if the wax is unevenly dispersed, other substances may be dispersed unevenly. Moreover, this may cause a fusion during the process of pulverization. Furthermore, the wax content may becomes uneven between the collected toner as a result of the classification and the toner substances of coarse or fine particles, and thus the recycling of the coarse or fine particles becomes difficult. Therefore, it is generally difficult to provide the pulverization toner with all of a wide fixing temperature range, the uniform physical property of the toner, and easiness of the production at the same time.

Moreover, the toner containing the wax produced in accordance with the pulverization method has a problem in durability. Generally speaking, the region of the wax or an interface between the region of the wax and the region of the binder resin is weak compared to the region of the binder resin, and thus the region of the wax or the interface between the region of the wax and the region of the binder resin is highly likely broken at the time of pulverization. Namely, the pulverization toner is highly likely to have the wax on the surface thereof, and such the wax present on the surface of the toner becomes a factor for staining a photoconductor, or staining a carrier in a two-component developer.

On the other hand, the chemical toner has a large content of the wax, and a high potential for flexibility in the structural design, but the know-how for the structural design is not yet sufficient, and it is not economical, since most of the production equipments and know-how of the pulverization toner cannot be used in the production of the chemical toner. Moreover, depending on the production method, the varieties of the binder resin for use may be limited, a large volume of the effluent treatment may be required, and a large amount of the organic solvent may be required to use. For example, only polyester resins can be used in a suspension polymerization method, and a large amount of the organic solvent is required in a dissolution suspension method. Moreover, for example, 10 times by weight of washing water is required for removing (washing) a surfactant of the like used at the time of a reaction, emulsification, liquid dispersion, or the like from the surface of the toner at the time of producing the toner in these polymerization methods.

As a method for producing a toner other than the pulverization method and the chemical method, there has been disclosed a spray dry method wherein particles are atomized by blowing a resin melted solution by using a compressed air or the like (refer to Japanese Patent Application Laid-Open (JP-A) No. 2005-258394). However, further modification or improvement needs to be done for a means and method for controlling the structure of the toner.

As a technology positioned between the pulverization method and the spray dry method, there have been known a spinning pulverization method wherein a resin is spun and then pulverized (refer to JP-A No. 2004-332130), and a method for producing composite particles by using a composite spinning technology (refer to JP-A No. 2005-187773). In this method, it may be possible to produced a toner encapsulating wax, which is difficult to be produced in accordance with the pulverizing method, for example by spinning the binder resin while supplying a compound of a low melting point into the binder resin by means of a composite spinning nozzle (e.g., a core-in-sheath spinning nozzle, and a multiple-tube spinning nozzle), and then pulverizing the resin fibers and classifying the same. However, this method has problems such that the construction and control of the nozzle becomes complicated.

Moreover, there has been proposed a method for producing a toner encapsulating wax in the similar manner to the one disclosed in JP-A No. 2005-187773 (refer to JP-A No. 2006-285198). This method utilizes a shape or inner characteristics of a nozzle. For example, an encapsulating structure is formed by using a double tube nozzle, and supplying the binder resin from the outer tube and the wax from the inner tube. Alternatively, an encapsulating structure is formed in a nozzle by using the nozzle which has an inner surface having higher compatibility to the binder resin than wax. The thus obtained fibrous product is pulverized to thereby yield a toner. However, in the case where the multiple tube nozzle is used, there is a problem such that the construction of the device becomes complicated. Moreover, no specific descriptions about the inner surface having higher compatibility to the binder resin than the wax are disclosed.

As a method for controlling the state of the wax present in the toner, there has been disclosed a method for forming a thin layer after melt-kneading the wax and the binder resin (refer to Japanese Patent (JP-B) No. 3409100). In accordance with this method, the dispersion state of the wax becomes excellent by thinning the kneaded product containing the wax, and then quenching.

BRIEF SUMMARY OF THE INVENTION

Under the consideration of the above-mentioned problems in the related art, the present invention aims at providing a method for producing resinous particles, which is capable of producing resinous particles each encapsulating an additive, and does not require an organic solvent and an effluent treatment, as well as providing a precursor and resinous particles produced by such the method. The present invention also aims at providing a toner containing such the resinous particles, a developer containing the toner, a toner container housing the toner, a process cartridge using the toner, an image forming method using the toner, and an image forming apparatus using the toner.

The first aspect of the present invention is a method for producing resinous particles, which contains: melting a mixture containing a binder resin and at least one additive having a melting point which is lower than T1/2 of the binder resin, so as to prepare a molten material, where T1/2 denotes a softening point determined in accordance with a 1/2 method; atomizing resinous particles from the molten material in an atmosphere having a temperature which is higher than a glass transition temperature of the binder resin and is lower than 3 times of T1/2 of the binder resin; retaining the resinous particles in an atmosphere having a temperature which is higher than the glass transition temperature of the binder resin, and is lower than 1.5 times of T1/2 of the binder resin for 1 second to 15 seconds; and cooling and solidifying the resinous particles.

The second aspect of the present invention is a method for producing resinous particles, which contains: melting a mixture containing a binder resin and at least one additive having a melting point which is lower than T1/2 of the binder resin so as to prepare a molten material, where T1/2 denotes a softening point determined in accordance with a 1/2 method; increasing a specific surface of the molten material in an atmosphere having a temperature which is higher than a glass transition temperature of the binder resin, and is lower than 3 times of T1/2 of the binder resin, so as to form a precursor; retaining the precursor in an atmosphere having a temperature which is higher than the glass transition temperature of the binder resin, and is lower than 1.5 times of T1/2 of the binder resin for 1 millisecond to 10 milliseconds; cooling and solidifying the precursor; and atomizing resinous particles from the precursor.

The third aspect of the present invention is the method for producing resinous particles according to the second aspect of the present invention, wherein one dimensional size of the precursor is from 0.5 times or more to less than 1.2 times of a volume average particle diameter of the resinous particles.

The fourth aspect of the present invention is the method for producing resinous particles according to any one of the first to third aspect of the present invention, wherein the atomizing resinous particles or the increasing a specific surface of the molten material comprises supplying the molten material into a chamber having an outlet, and supplying a first gas flow from a means other than a means for supplying the molten material so as to make a contact with the molten material.

The fifth aspect of the present invention is the method for producing resinous particles according to the fourth aspect of the present invention, wherein the first gas flow has a temperature ranging from T1/2 of the binder resin or higher to 3 times of T1/2 of the binder resin or lower.

The sixth aspect of the present invention is the method for producing resinous particles according to any one of the fourth or fifth aspect of the present invention, wherein the chamber has a part which is in the shape of cylinder or corn, the first gas flow forms a circulated flow in the chamber, and an axis of the circulated flow has the same direction as a direction for supplying the molten material in the chamber.

The seventh aspect of the present invention is the method for producing resinous particles according to any one of the fourth to sixth aspects of the present invention, wherein the first gas flow has a temperature ranging from 150° C. or more to 370° C. or less.

The eighth aspect of the present invention is the method for producing resinous particles according to any one of the fourth to seventh aspects of the present invention, wherein the retaining the resinous particles or the retaining the precursor contains supplying a second gas flow having the temperature ranging from T1/2 of the binder resin or more to 3 times of T1/2 of the binder resin into the chamber.

The ninth aspect of the present invention is the method for producing resinous particles according to the eighth aspect of the present invention, wherein the second gas flow is introduced along an inner wall of the chamber.

The tenth aspect of the present invention is the method for producing resinous particles according to any one of the eighth or ninth aspect of the present invention, wherein the second gas flow is introduced from a side of the chamber.

The eleventh aspect of the present invention is the method for producing resinous particles according to any one of the eighth to tenth aspects of the present invention, wherein the chamber has a part which is in the shape of cylinder or corn, the second gas flow forms a circulated flow in the chamber, and an axis of the circulated flow has the same direction as a direction for supplying the molten material in the chamber.

The twelfth aspect of the present invention is the method for producing resinous particles according to any one of the eighth to eleventh aspects of the present invention, wherein the second gas flow has a temperature ranging from 120° C. to 350° C.

The thirteenth aspect of the present invention is the method for producing resinous particles according to any one of the fourth to twelfth aspects of the present invention, wherein the cooling and solidifying contains supplying a third gas flow having a temperature lower than T1/2 of the binder resin from at least one path to the chamber.

The fourteenth aspect of the present invention is the method for producing resinous particles according to the thirteenth aspect of the present invention, wherein the third gas flow is introduced along an inner wall of the chamber.

The fifteenth aspect of the present invention is the method for producing resinous particles according to any one of the thirteenth or fourteenth aspect of the present invention, wherein the third gas flow is introduced from a side of the chamber.

The sixteenth aspect of the present invention is the method for producing resinous particles according to any one of the thirteenth to fifteenth aspects of the present invention, wherein the chamber has a part which is in the shape of cylinder or corn, the third gas flow forms a circulated flow in the chamber, and an axis of the circulated flow has the same direction as a direction for the molten material in the chamber.

The seventeenth aspect of the present invention is the method for producing resinous particles according to any one of the fourth to sixteenth aspects of the present invention, wherein a differential pressure between an inner pressure of the chamber and an exterior pressure is in the range of −2 kPa to 2 kPa.

The eighteenth aspect of the present invention is the method for producing resinous particles according to any one of the fourth to seventeenth aspects of the present invention, wherein the unit for supplying the molten material is a mouth ring having an opening which has a length of 0.1 mm to 5.0 mm in a minor axis.

The nineteenth aspect of the present invention is the method for producing resinous particles according to the eighteenth aspect of the present invention, wherein the mouth ring is a nozzle having an opening in the shape of oval and an opening diameter of 0.16 mm to 1.00 mm.

The twentieth aspect of the present invention is the method for producing resinous particles according to any one of the first to nineteenth aspects of the present invention, wherein the additive contains wax.

The twenty-first aspect of the present invention is the method for producing resinous particles according to any one of the first to twentieth aspects of the present invention, wherein the mixture further contains a coloring agent.

The twenty-second aspect of the present invention is the method for producing resinous particles according to any one of the first to twenty-first aspects of the present invention, wherein the mixture further contains a charge controlling agent.

The twenty-third aspect of the present invention is the method for producing resinous particles according to any one of the second or third aspect of the present invention, wherein the precursor is in the shape of fibers, and a ratio of a major axis length of the precursor to a minor axis length of the precursor is 5 or more.

The twenty-fourth aspect of the present invention is the method for producing resinous particles according to any one of the second or third aspect, wherein the precursor is in the shape of a film, and a ratio of a square root of a surface area of the precursor to a thickness of the precursor is 5 or more.

The twenty-fifth aspect of the present invention is resinous particles obtainable by the method as defined in any one of the first to twenty-fourth aspect of the present invention.

The twenty-sixth aspect of the present invention is the resinous particles according to the twenty-fifth aspect of the present invention, wherein the resinous particles have a surface wax amount of 0.65% by weight to 4.2% by weight.

The twenty-seventh aspect of the present invention is a toner contains resinous particles obtainable by the method as defined in any one of the first to twenty-fourth aspects of the present invention.

The twenty-eighth aspect of the present invention is the toner according to the twenty-seventh aspect of the present invention, wherein the toner further contains particles having a volume average particle diameter of from $\frac{1}{1000}$ of a volume average particle diameter of the resinous particles to $\frac{1}{10}$ of the volume average particle diameter of the resinous particles.

The twenty-ninth aspect of the present invention is a developer which contains a toner containing resinous particles, wherein the resinous particles are obtainable by the method as defined in any one of the first to twenty-fourth aspects of the present invention.

The thirtieth aspect of the present invention is the developer according to the twenty-ninth aspect of the present invention, further containing a carrier.

The thirty-first aspect of the present invention is a toner container which contains: a container; and a toner which contains resinous particles, and is housed in the container, wherein the resinous particles are obtainable by a method as defined in any one of the first to twenty-fourth aspects of the present invention.

The thirty-second aspect of the present invention is a process cartridge which contains: a latent electrostatic image bearing member which is configured to form a latent electrostatic image thereon; and a developing unit which houses a toner, and is configured to develop the latent electrostatic image with the toner so as to form a visualized image, wherein the toner comprises resinous particles, the resinous particles being obtainable by the method as defined in any one of the first to twenty-fourth aspects of the present invention.

The thirty-third aspect of the present invention is an image forming method which contains: forming a latent electrostatic image on a latent electrostatic image bearing member; developing the latent electrostatic image with a toner so as to form a visualized image; transferring the visualized image on a recording medium; and fixing the transferred visualized image on the recording medium, wherein the toner contains resinous particles, the resinous particles being obtainable by the method as defined in any one of the first to twenty-fourth aspects of the present invention.

The thirty-fourth aspect of the present invention is an image forming apparatus which contains: a latent electrostatic image bearing member; a charging unit configured to charge the latent electrostatic bearing member so as to form a latent electrostatic image; a developing unit configured to develop the latent electrostatic image with a toner so as to form a visualized image; a transfer unit configured to transfer the visualized image onto a recording medium; and a fixing unit configured to fix the transferred visualized image on the recording medium, wherein the toner contains resinous particles, the resinous particles being obtainable by the method as defined in any one of the first to twenty-fourth aspects of the present invention.

According to the present invention, there can be provided a method for producing resinous particles, which is capable of producing resinous particles each encapsulating an additive, and does not require an organic solvent and an effluent treatment, as well as providing a precursor and resinous particles produced by such the method. According to the present invention, there can be also provided a toner containing such the resinous particles, a developer containing the toner, a toner container housing the toner therein, a process cartridge using the toner, an image forming method using the toner, and an image forming apparatus using the toner.

DETAILED DESCRIPTION OF THE INVENTION

Figure 1A:
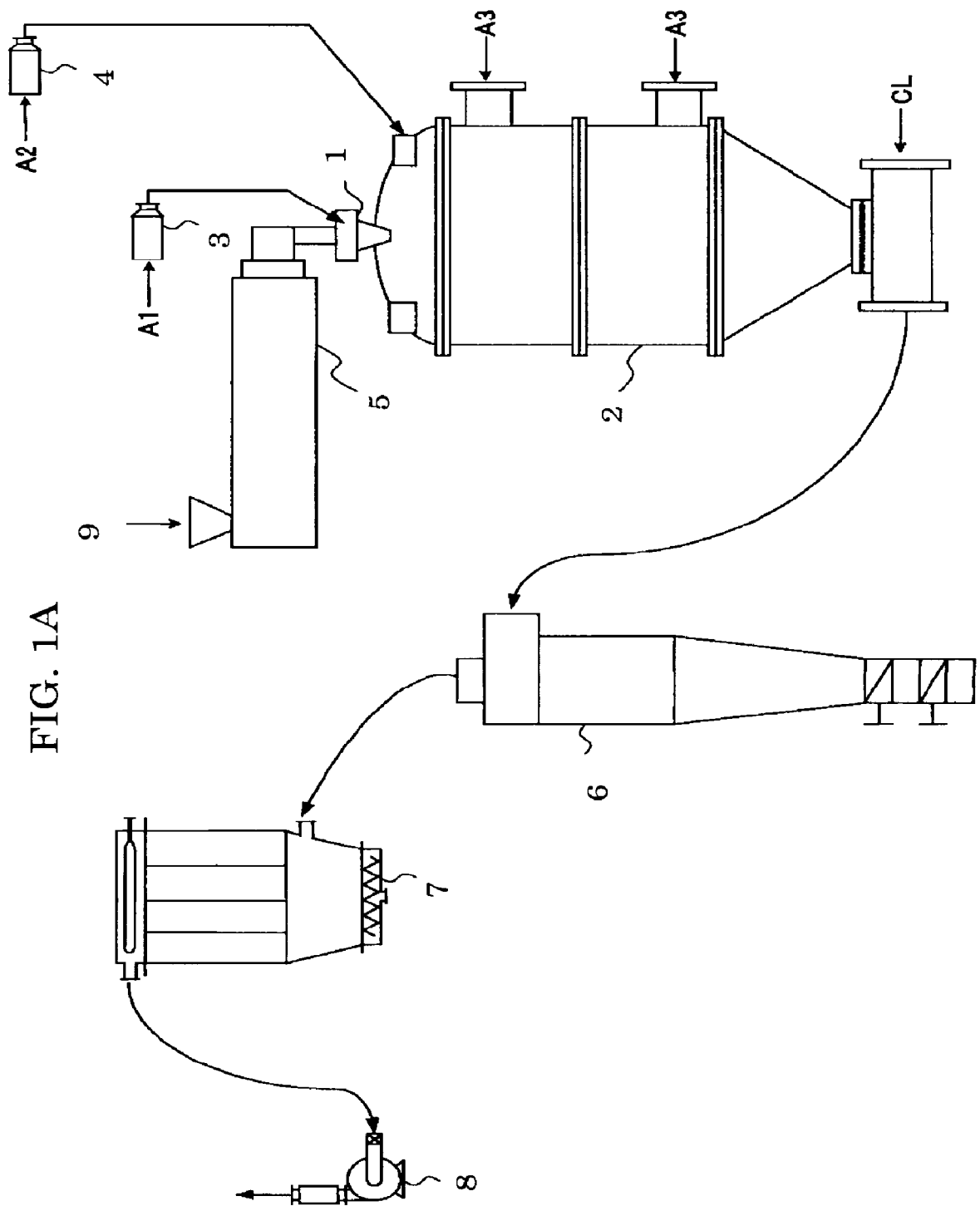
FIG. 1A is a schematic diagram showing a first example of an apparatus for producing resinous particles for use in the present invention.

The preferred embodiment for carrying out the present invention is now explained herein after with reference to drawings.

In the first embodiment of a method for producing resinous particles of the present invention, resinous particles each containing a binder resin and at least one additive, and encapsulating the additive therein are produced. Here, the melting point of the additive is lower than the melting point of the binder resin in accordance with a 1/2 method (hereinafter, this melting point is referred as T1/2). Specifically, a mixture containing the additive and the binder resin is melted to prepare a molten material, and resinous particles are atomized from the molten material in an atmosphere having a temperature ranging from a glass transition temperature (hereinafter, referred as Tg) of the binder resin to 3 times of T1/2 of the binder resin. Thereafter, the resinous particles are retained in an atmosphere having a temperature ranging from Tg of the binder resin to 1.5 times of T1/2 of the binder resin, to thereby cool and solidify the resinous particles for 1 second to 15 seconds. Therefore, the first embodiment of the method of the present invention has characteristics in that the resinous particles are formed in the melted state, and the formed resinous particles in the melted state are retained for a certain period at a certain temperature.

The formation of the resinous particles can be carried out by means of a system having a single or double fluid type spry nozzle, a rotation disc atomizer, an electrostatic atomizer, an ultrasonic atomizer, a pulverizer, or the like, but the means for atomizing the resinous particles not limited to these examples.

Hereinafter, the differences between the method of the present invention and the conventional method are explained. In the conventional method for producing resinous particles in accordance with a pulverizing method, the mixture is in the solid state at the time of forming the resinous particles, whereas the mixture is in the melted state in the method of the present invention. Although there is a case where the resinous particles are partially melted by a heat generated by pulverizing during the pulverizing process, this is a phenomenon that, just after pulverizing the mixture, i.e. just after forming the resinous particles, the resinous particles are partially melted. Therefore, this is not a case the resinous particles are in the melted state at the time of atomizing the resinous particles. There is also the conventional method, i.e. a thermal atomizing method (refer to JP-A No. 2000-20241), such that the resinous particles are retained in a high temperature atmosphere so as to control various properties of the resinous particles, but the solid resinous particles are supplied in the high temperature atmosphere in this method. Therefore, this method is also different from the present invention. Moreover, in accordance with the conventional spray drying method (refer to JP-A No. 2005-258394), the resinous particles are cooled soon after the resinous particles are atomized, and thus this is also different from the present invention.

In the embodiment of the present invention, the compositional materials of the resinous particles are prevented from the segregation within each resinous particle, as the resinous particles are atomized from the molten material in the atmosphere having the temperature range of from Tg of the binder resin to 3 times of T1/2 of the binder resin. Note that the temperature of the molten material just before atomizing resinous particles is preferably in the range of from T1/2 of the binder resin to 2.5 times of T1/2 of the binder resin.

The time duration for retaining the resinous particles in the atmosphere having the temperature ranging from Tg of the binder resin to 1.5 times of T1/2 of the binder resin is theoretically "t" which is the time required for moving a distance "x" which is from the means or place for cooling and solidifying the resinous particles to the place where is the farthest within the resinous particle forming section. The transferring velocity v(=x/t) is determined as a value (V/s) which divides the transferring quantity V (volume; normal conversion) per unit time of the air flow containing the resinous particles from the means or place for cooling and solidifying the resinous particles to the place where is the farthest within the resinous particle forming section by the largest area s of a plain where the resinous particles are present on the plane vertical to the straight line of the means or place for cooling and solidifying the resinous particles to the place where is the farthest within the resinous particle forming section.

The heated normal air, and heated inert gas such as nitrogen, helium, and argon in the case where it is necessary to prevent oxidation or the like, can be used as the atmosphere. In the case where it is necessary to prevent hydrolysis, moreover, dehumidified gas can be used as the atmosphere.

In the conventional method for cooling and solidifying the molten material and pulverizing the solidified product (a melt-kneading pulverizing method), it has been known that the compositional materials tend to be separated or grow grains at the time of cooling and solidifying the molten material due to the differences in their solidifying point, viscosity, surface tension, compatibility, and the like, and there is unevenness in the content of the compositional materials within each resinous particle just after being pulverized (refer to JP-A Nos. 2006-285198, and 2003-280244).

In the embodiment of the present invention, the inner structure of the resinous particle is self-formed, as the resinous particles are formed in the melted state, and the atomized resinous particles in the melted state are retained at the certain temperature for the certain period. Specifically, within the compositional materials of the resinous particles, the materials which are more stable in the surface area of the particle move towards the surface area of the particle, and the materials which are more stable in the inner area of the particle move towards the inner area of the particle. Therefore, the self-formation of the inner structure of the resinous particle can be controlled by adjusting the temperature and the duration for retaining the resinous particles of the melted state in the atmosphere.

Examples of the method for controlling the progress of the formation of the inner structure include a method for controlling the cooling speed of the resinous particles. In accordance with this method, the progress of the formation of the inner structure can be controlled. For example, in the case where it is necessary to prevent the composition materials from sifting, it can be controlled by increasing the cooling speed. In the case where it is necessary to encourage the composition materials to sift, it can be controlled by decreasing the cooling speed.

In the embodiment of the present invention, the inner structure of the resinous particle can be solidified by cooling the resinous particles wherein the inner structure is formed at less than T1/2 of the binder resin, preferably at T1/2×(3/4) or less, and more preferably at Tg of the binder resin or less. If the resinous particles are cooled at the temperature equal to T1/2 or more, the resinous particles may be aggregated to each other, or be attached to the inner wall or pipes of the production apparatus. In order to prevent the inner structure of the resinous particles from changing, the cooling speed is preferably 20° C./sec or faster, more preferably 25° C./sec or faster.

There is also known the conventional method for treating the resinous particles containing wax, i.e. toner containing wax, with hot blast (refer to JP-A No. 2006-11017). In this method, however, the wax starts melting by the hot blast, and thus the wax is extruded on the surface of the toner. This is also one of examples for the change in the inner structure of the resinous particle, but this change is regarded as a problem as in the case described in JP-B No. 409100.

In the embodiment of the present invention, the additives such as the wax are prevented from extruding to the surface of the resinous particle in advance, as the resinous particles are atomized in the melted state. In the process of cooling and solidifying the resinous particles, the temperature of the inner area of the resinous particle is higher than the temperature of the surface area of the resinous particle, and thus the additives are sifted to the inner area rather than extruding onto the surface. Moreover, the melting point of the additives is lower than T1/2 of the binder resin, the additives are cooled and solidified following to the binder resin at the time of cooling and solidifying the resinous particles. Therefore, the additives are sifted to the inner area of the resinous particles where being cooled and solidified, following to the surface area. Namely, in the embodiment of the present invention, the resinous particles encapsulating the additives are formed by positively utilizing the phenomenon of the extrusion of the additives, which has been regarded as a problem in the art.

Examples of the means for cooling and solidifying the resinous particles include a means for cooling by supplying a cooling gas, e.g. air, without stopping the movement of the precursor, a means for cooling a container in which the precursor is moving, e.g. pipes, and the like.

In the second embodiment of a method for producing resinous particles of the present invention, resinous particles each containing a binder resin and at least one additive, and encapsulating the additive therein are produced. Here, the melting point of the additive is lower than T1/2 of the binder resin. Specifically, a mixture containing the additive and the binder resin is melted to prepare a molten material, and a precursor is formed in an atmosphere having a temperature ranging from a glass transition temperature (hereinafter, referred as Tg) of the binder resin to 3 times of T1/2 of the binder resin, by increasing the specific surface area of the molten material. Thereafter, the precursor is retained in an atmosphere having a temperature ranging from Tg of the binder resin to 1.5 times of T1/2 of the binder resin for 1 millisecond to 10 milliseconds, to thereby cool and solidify the precursor, and then resinous particles are formed from the solidified precursor. Therefore, the second embodiment of the method of the present invention has characteristics in that the precursor is formed in the melted state, and the formed precursor in the melted state is retained for a certain period at a certain temperature.

Hereinafter, the differences between the method of the present invention and the conventional method are explained. In the conventional method for producing resinous particles by pulverizing a precursor (refer to JP-A No. 2004-332130, and JP-B No. 3409100), resinous particles are quenched just after being extruded from a kneader, a die, a mouth ring, or the like. Therefore, this conventional method is different from the embodiment of the present invention.

In the embodiment of the present invention, the compositional materials of the precursor are prevented from the segregation within the precursor, as the precursor is formed by increasing the specific surface area of the molten material in the atmosphere having the temperature range of from Tg of the binder resin to 3 times of T1/2 of the binder resin. Therefore, the compositional materials of the resinous particles obtained from such the precursor can also be prevented from the segregation within each resinous particle. Note that the temperature of the molten material just before atomizing resinous particles is preferably in the range of T1/2 of the binder resin to 2.5 times of T1/2 of the binder resin.

The increase of the specific surface area of the molten material can be carried out by means of a system having a single or double fluid type spry nozzle, a rotation disc atomizer, an electrostatic atomizer, an ultrasonic atomizer, a means for melt spinning, a means for forming a film, a pulverizer, or the like, but the means for enlarging the specific surface area of the molten material is not limited to these examples.

The time duration for retaining the precursor in the atmosphere having the temperature ranging from Tg of the binder resin to 1.5 times of T1/2 of the binder resin is theoretically "t" which is the time required for moving a distance "x" which is from the means or place for cooling and solidifying the precursor to the place where is the farthest within the precursor forming section. The transferring velocity v(=x/t) is determined as a value (V/s) which divides the transferring quantity V (volume; normal conversion) per unit time of the air flow containing the precursor from the means or place for cooling and solidifying the precursor to the place where is the farthest within the precursor forming section by the largest area s of a plain where the precursor is present on the plane vertical to the straight line of the means or place for cooling and solidifying the precursor to the place where is the farthest within the precursor forming section.

In the case where the precursor is continuously formed, for example, the case where the precursor is a continuous fiber or film, the time t can be calculated by the streamline velocity of the fiber or the like and the transferring distance y of the streamline. Even when the transferring distance y of the streamline is close to the distance x which is from the means or place for cooling and solidifying the precursor to the place where is the farthest within the precursor forming section, the sufficiently substantial value can be obtained in the industrial point of view. For example, when the precursor is a continuous fiber, the streamline velocity of the fiber is calculated by the following formula:

Velocity=discharging rate (volume)/diameter of fiber

The heated normal air, and heated inert gas such as nitrogen, helium, and argon in the case where it is necessary to prevent oxidation or the like, can be used as the atmosphere. In the case where it is necessary to prevent hydrolysis, moreover, dehumidified gas can be used as the atmosphere.

In the conventional method for cooling and solidifying the molten material and pulverizing the solidified product (a melt-kneading pulverizing method), it has been known that the compositional materials tend to be separated or grow grains at the time of cooling and solidifying the molten material due to the differences in their solidifying point, viscosity, surface tension, compatibility, and the like, and there is unevenness in the content of the compositional materials within each resinous particles just after being pulverized (refer to JP-A Nos. 2006-285198, and 2003-280244).

In the embodiment of the present invention, the inner structure of the precursor is self-formed, since the precursor is formed in the melted state, and the formed precursor of the melted state is retained at the certain temperature for the certain period. Specifically, within the compositional materials of the precursor, the materials which are more stable in the surface area of the precursor move towards the surface area of the precursor, and the materials which are more stable in the inner area of the precursor move towards the inner area of the precursor. Therefore, the self-formation of the inner structure of the precursor can be controlled by adjusting the temperature and the duration for retaining the precursor in the melted state in the atmosphere.

Examples of the method for controlling the progress of the formation of the inner structure include a method for controlling the cooling speed of the precursor. In accordance with this method, the progress of the formation of the inner structure can be controlled. For example, in the case where it is necessary to prevent the composition materials from sifting, it can be controlled by increasing the cooling speed. In the case where it is necessary to encourage the composition materials to sift, it can be controlled by decreasing the cooling speed.

In the embodiment of the present invention, the inner structure of the precursor can be solidified by cooling the precursor wherein the inner structure is formed at less than T1/2 of the binder resin, preferably at T1/2×(3/4) or lower, more preferably at Tg of the binder resin or lower. If the precursor cooled at the temperature equal to T1/2 or higher, the precursor may be aggregated to each other, or be attached to the inner wall or pipes of the production apparatus. In order to prevent the inner structure of the precursor from changing, the cooling speed is preferably 20° C./sec. or faster, more preferably 25° C./sec. or faster.

There is also known the conventional method for treating the resinous particles containing wax, i.e. toner containing wax, with hot blast (refer to JP-A No. 2006-11017). In this method, however, the wax starts melting by the hot blast, and thus the wax is extruded on the surface of the toner. This is also one of examples for the change in the inner structure of the resinous particle, but this change is regarded as a problem as in the case described in JP-B No. 409100.

In the embodiment of the present invention, the additives such as the wax are prevented from extruding to the surface of the precursor in advance, as the precursor is formed in the melted state. In the process of cooling and solidifying the precursor, the temperature of the inner area of the precursor is higher than the temperature of the surface area of the precursor, and thus the additives are sifted to the inner area rather than extruding onto the surface. Moreover, the melting point of the additives is lower than T1/2 of the binder resin, the additives are cooled and solidified following to the binder resin at the time of cooling and solidifying the precursor. Therefore, the additives are sifted to the inner area of the precursor where being cooled and solidified, following to the surface area. Namely, in the embodiment of the present invention, the precursor encapsulating the additives is formed by positively utilizing the phenomenon of the extrusion of the additives, which had been regarded as a problem in the conventional art.

Examples of the means for cooling and solidifying the precursor include a means for cooling by supplying a cooling gas, e.g. air, without stopping the movement of the precursor, a means for cooling a container in which the precursor is moving, e.g. pipes, and the like.

In order to utilize the change of the inner structure, the precursor has a one dimensional size (e.g. a length, a thickness, and a diameter) of from 0.5 times or more to less than 1.2 times of the volume average particle diameter of resinous particles, preferably 0.65 times or more to less than 1.15 times. When the one dimensional size of the precursor is within this range, the surface of the precursor becomes the surface of a resinous particle that is a final product. In the case where the whole dimensional size of the precursor is less than 0.5 times or 1.2 times or more of the volume average particle diameter of the resinous particle, the particle size distribution of the resinous particles become wide, or a yield may be decreased. Especially when the size of the precursor is 1.2 times of more of the volume average particle diameter of the resinous particles, it is necessary to divide the precursor more finely, e.g. pulverization, to form resinous particles. Therefore, a ratio of the surface which is newly formed by dividing the precursor becomes large with respect to the surface of the precursor, having a small amount of the additive, and thus the additive tends to be extruded to the surface of the resinous particle.

The precursor is preferably in the shape of a fiber or a film. The fibrous precursor preferably has a ratio of the long axis to the minor axis to be 5 or more, and the film precursor preferably has a ratio of a square root of an area to a thickness to be 5 or more. In the case where the precursor has the ratio outside the above ranges, it is difficult to carry out pulverization by means of the conventional pulverization devices for the reasons such that an aerodynamic diameter becomes larger with respect to the weight of the precursor. Moreover, a particle diameter of a spherical particle having the same volume as that of such the precursor is only 2 times of the volume average particle diameter of the resinous particles, it is more preferably to directly produce resinous particles rather than forming such the precursor.

The length of the fibrous precursor, and the thickness and area of the film precursor can be determined by analyzing the image obtained under an optical microscope, a laser microscope, an electron microscope, or the like. Specifically, the sample is measured on the same enlarged image to the image of the product which size is known in advance at the same magnification, and the size of the sample is compared to the size of the product on the image to thereby determine the size of the precursor.

In the case where a precursor other than the one mentioned above is used, it preferably satisfies 0.3SP<SZ, more preferably 0.6SP<SZ where SP denotes the specific surface area of the resinous particle and SZ denotes the specific surface area of the precursor. In the case where the precursor has a specific surface area satisfying 1.5SP<SZ, the yield of the resinous particles is decreased. It is ideal that SZ and SP are the substantially equal.

The specific surface area is measure, for example, in accordance with a BET method, or by the calculation based on the particle diameter, a thickness of a thin layer or pellet, a diameter of a fiber, or the like.

In the present invention, examples of the method for mixing the additive and the binder resin include a method for mixing by means of the conventional powder mixer, a method for melt kneading by means of the conventional melting device, and the like. Moreover, the melt kneading can be performed after mixing with the powder mixer.

Examples of the powder mixer include a horizontal cylinder type mixer, a V-type mixer, a duplex corn type mixer, a ribbon type mixer, a minor axis rod or pin rotor type mixer, a plural axes paddle type mixer, a corn screw mixer, a high-speed flow type mixer, a rotational disc type mixer, a muller type mixer, an air-current agitation type mixer, a static mixer (no agitation), a composite device thereof, and the like. Specific examples thereof are: Nauta mixer, Cyclomix, Mechanofusion, Turbulizer, Nobilta, Nanocular, and Agglomaster, all manufactured by Hosokawa Micron Corporation; HYBRIDIZATION SYSTEM, and MECHANO MICROS, all manufactured by Nara Machinery Co., Ltd.; Vertical granulator manufactured by Powrex Corporation; High-speed mixer manufactured by Fukae Powtec Co., Ltd.; Henschel Mixer manufactured by Mitsui Mining Co., Ltd.; and the like.

Examples of the melting device include a conventional heat tank type fuser, one, two or plural axes extruder, and the like. Specific examples thereof include: KNEADEX manufactured by Mitsui Mining Co., Ltd.; GT Series, and BT Series, all manufactured by PLABOR co, LTD; KRC Kneader, KEX Extruder, KEXP Extruder, and Open Kneader, all manufactured by Kurimoto Ltd.; and the like.

Figure 8:
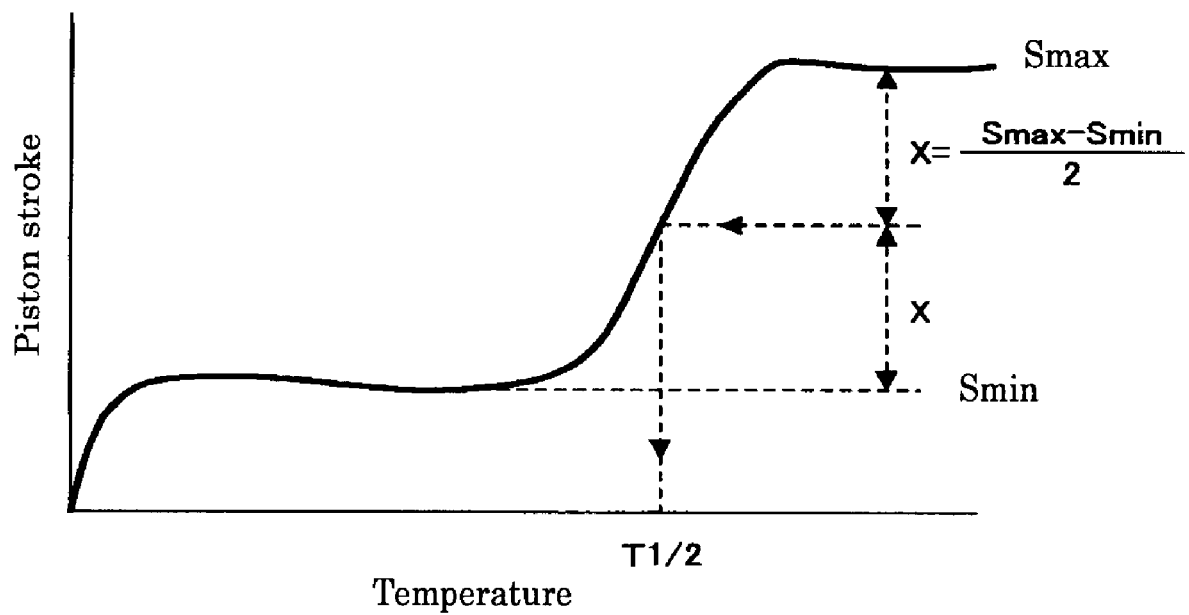
FIG. 8 is a diagram showing a flow curve of a flow tester.

In the present invention, T1/2 is determined from a flow curve (refer to FIG. 8) obtained by the flow tester. For example, an elevated type flow tester CFT-500 (manufactured by Shimadzu Corporation) can be used as the measuring device for T1/2. The conditions for the measurement are as follows.

Load: 30 kg/cm$^2$

Rate of temperature increase: 3.0° C./min
Aperture of die: 0.50 mm
Length of die: 1.0 mm In the present invention, the melting point is determined by a peak top showing the maximum endothermic value on the DSC curve in the differential scanning calorimetry (DSC). As the measuring device thereof, TA-60WS and DSC-60 (manufactured by Shimadzu Corporation) can be used. The conditions for the measurement are as follows.

Sample container: a sample pan (including a rid) made of aluminum
    Amount of sample: 5 mg
    Reference: a sample pan made of aluminum (aluminum: 10 mg)
    Atmosphere: nitrogen gas (flow rate: 50 ml/min)
    Conditions of temperature
    Initial temperature: 20° C.
    Rate of temperature increase: 10° C./min
    Termination temperature: 150° C.
    Retention time: none
    Rate of temperature decrease: 10° C./min
    Termination temperature: 20° C.
    Retention time: none
    Rate of temperature increase: 10° C./min
    Termination temperature: 150° C.

The results from the measurement can be analyzed by using a data analysis software TA-60, Version 1.52 (manufactured by Shimadzu Corporation). Specifically, the range of ±5° C. based on the point where shows the maximum peak on the DrDSC curve which is the DSC differential curve for the second temperature elevation is designated, and a peak temperature is determined by using a peak analyzing function of the analysis software. Thereafter, the maximum endothermic value (melting point) of the DSC curve is determined in the range between ±5° C. of the above-determined peak temperature on the DSC curve by using the peak analyzing function of the analysis software.

In the present invention, Tg can be determined in the same manner as that of the melting point.

In the case where two or more resins are used as the binder resin, the thermal properties, e.g. Tg, and T1/2, of the binder resin can be determined as follows.

Using the properties of the main resin which is accounted for 10% by weight or more in the total binder resin.

Using the maximum value among Tg of the main resin, as Tg.
    Using the minimum value among T1/2 of the main resin, as T1/2.
    Using the maximum value among T1/2 of the main resin as 1.5 times of T1/2.
    Using the maximum value among T1/2 of the main resin as 3 times of T1/2

In the case where two or more additives are used, the melting point is determined as follows.

Using the melting point of the main substance which is accounted for 10% by weight or more in the all additives having melting points lower than T1/2 of the binder resin.
    Using the minimum value among the melting point of the main substance, as the melting point.

In the present invention, the molten material is preferably supplied into a chamber which has an outlet for gas, resinous particles and the like, and is preferably made contact with a first gas flow supplied from a means other than the means for supplying the molten material such as a melt-kneader. Here, the first gas flow provides the molten material with the energy for forming resinous particles or precursor, as well as forming an atmosphere for forming the resinous particles and precursor. The first air flow also provides the energy for heating or cooling the atmosphere so as to maintain the temperature of the atmosphere for retaining the formed resinous particles or precursor.

In the present invention, the first gas flow which gives the molten material with the energy for forming resinous particles or precursor preferably has high pressure, and more preferably has high pressure and high temperature. In this case, the temperature of the atmosphere for forming the resinous particles or precursor is industrially correlated to the temperature of the first gas flow. Namely, the temperature of the atmosphere can be controlled by controlling the temperature of the first gas flow. The temperature of the first gas flow is preferably Tg of the binder resin or more, and more preferably T1/2 of the binder resin or more. Moreover, the temperature of the first gas flow is preferably 3 times of T1/2 of the binder resin or less, as there is a case where the binder resin is deteriorated or decomposed.

In order to form an atmosphere for retaining the formed resinous particles or precursor, the second gas flow may be introduced, if necessary. The temperature of the second gas flow is preferably in the range of from T1/2 of the binder resin to 3 times of T1/2 of the binder resin. Moreover, the second gas flow is preferably formed within the chamber. In this way, the formed resinous particles or precursor can be prevented from being scattered, and the atmosphere can be efficiently formed. Also, this prevents the second gas flow from being cooled, namely capable of maintaining the temperature of the second gas flow.

The first or second gas flow is cooled by adiabatic expansion, mixing with another atmosphere, emission, conduction, or the like, but the temperature of the atmosphere where the formed resinous particles or precursor is kept is preferably in the range of from Tg of the binder resin to 1.5 times of T1/2 of the binder resin, and more preferably in the range of from Tg of the binder resin+15° C. to 1.5 times of T1/2 of the binder resin.

The third gas flow may be supplied in the chamber from at least one path so as to control the temperature of the atmosphere, or to prevent the formed resinous particles or precursor from attaching to the chamber. The temperature of the third gas flow is preferably less than T1/2 of the binder resin, more preferably less than 60° C., and the most preferably less than 40° C. In the case where it is necessary to maximize the cooling effect of the atmosphere without increasing the flow rate of the third gas flow, the temperature of the third gas flow may be adjusted at less than 15° C. The temperature of the third gas flow is preferably −40° C. or more, and more preferably −10° C. or more. In the case where the temperature of the third gas flow is less than −40° C., it becomes industrially inefficient. In the case where the temperature of the third gas flow is −10° C. or more, the final product can be industrially efficiently obtained.

In the present invention, the chamber has a cylindrical part and/or a corn part, and the first gas flow supplied into the chamber is a circulated flow having a one axis, i.e. one circulated flow, and the molten material is supplied into the chamber in the substantially same direction to the axis of the circulated flow. In this manner, the time for retaining the formed resinous particles or precursor in the atmosphere can be easily controlled.

In the present invention, at least one of the second gas flow or the third gas flow is supplied into the chamber along the inner wall of the chamber. At least one of the second gas flow or the third gas flow is supplied from the side of the chamber so as to efficiently form a circulated flow having one axis which has the same direction to the direction for supplying the molten material. If the third gas flow is supplied from the side of the chamber, the temperature of the area adjacent to the side of the chamber becomes low compared to the temperature of the centre of the chamber. Therefore, the formed resinous particles or precursor is prevented from attaching to the wall of the chamber as the temperature of the wall of the chamber is decreased, and the resinous particles or precursor which are going to hit the wall of the chamber are cooled just before hitting the wall.

The differential pressure between the static pressure inside the chamber, i.e. the pressure inside the chamber, and the pressure of exterior atmosphere, is industrially preferably in the range of from −2 kPa to 2 kPa. In the case where the differential pressure is less than −2 kPa, an unintentional air flow may flow into the chamber and this cause a problem in controlling the temperature of the atmosphere inside the chamber. In the case where the differential pressure is more than 2 kPa, an unintentional air flow may flow out from the chamber and this causes a leakage of the powder.

In the present invention, the means for supplying the molten material into the chamber is preferably a mouth ring in which a length of a minor axis of the opening thereof is 0.1 mm to 5 mm. The length of the minor axis of the opening is more preferably 0.16 mm to 3 mm, the most preferably 0.16 mm to 1 mm. Examples of such the mouth resin include: a circular nozzle or die having a diameter of 0.1 mm to 5 mm; an elliptical nozzle or die having a minor axis length of 0.1 mm to 5 mm; a slit, or a square nozzle or die having a side length of 0.1 mm to 5 mm; and the like. Among these, a nozzle having a substantially circular opening and having an opening diameter of 0.16 mm to 1 mm is preferably for the reason that resinous particles or a precursor is efficiently formed. The means for supplying the molten material may be constructed with a plurality of dies or nozzles.

In the present invention, the temperature of the atmosphere, or the temperature of the first gas flow, the second gas flow, the third gas flow, and the interior of the pipe can be measured by means of a commercially available temperature sensor. The temperature sensor can be appropriately selected without any restrictions. Examples of the temperature sensor include a thermocouple, a resistance thermometer bulb, a bimetal thermometer, a radiation thermometer, and the like. Among these, the thermocouple and the resistance thermometer bulb are industrially easier to use.

In the case where the temperature is measured by means of the resistance thermometer bulb, the sensor part is disposed in the section for the measurement. In the case where the temperature of the atmosphere where the resinous particles or precursor is formed is measured, the condition of the molten material in the chamber is observed with the naked eyes by watching the direction where the resinous particles or precursor is formed from the opening of the nozzle or die for supplying the molten material into the chamber, and the temperature at when the molten material starts being dispersed is conformed. Specifically, the temperature of the spot where is 5 mm to 20 mm distant from the opening is measured.

In the case where the first gas flow is used, the temperature of the first gas flow is measured at a position where is a downstream of a heating unit of the first gas flow and also up-stream of the inlet of the first gas flow, as an alternative value of the temperature of the atmosphere where the resinous particles or precursor is formed. Here, 35% to 100% of the measured value can be used as the alternative value. In order to decide which value to take within the range of 35% to 100%, it is necessary to perform a calibration for correlation by measuring the temperature of the atmosphere and the temperature of the first gas flow, after deciding the specific device and method to use. Industrially, it cab be determined by approximating the correlation with a linear equation.

The reason why the temperature of the atmosphere is determined as an alternative value obtained from the temperature of the first gas flow is because it is industrially difficult to monitor the temperature of the atmosphere during the period when the resinous particles or precursor is formed. Even of the thermocouple or the like is disposed in the space where the resinous particles or precursor is present in the melted state, the resinous particles or precursor is fused onto a sensor part of the thermocouple, and thus the temperature cannot be correctly measured, as well as lowing the quality of the resinous particles or precursor as a result that coarse particles or the like are mixed in the resinous particles or precursor.

In the case where the temperature of the atmosphere where the formed resinous particles or precursor is kept is measured, the temperature of the space where the resinous particles or precursor is kept can be measured by means of the thermocouple or the like. Specifically, the temperature of the spot where is 40 mm or more distant from the inlet for supplying the molten material into the chamber towards the direction where the resinous particles or precursor is formed can be measured. In the case where the formed resinous particles or precursor is kept in the chamber, the temperature is alternated with the temperature of the atmosphere inside the chamber by measuring with the thermocouple or the like by inserting the same from outside of the chamber. In this case, the sensor part of the thermocouple is preferably disposed at a position where is 50 mm or more inside and distant from the wall of the chamber. This is because the third gar flow may be supplied from the side wall of the chamber, or is arranged to flow along the wall of the chamber, in order to prevent the resinous particles or precursor from attaching or fusing to the wall of the chamber. Namely, in the case where the sensor part of the thermocouple or the like is disposed in the area adjacent to the side wall of the chamber, the sensor may measure the temperature of the atmosphere which is cooled by the third gas flow. Moreover, it is also the case in that the chamber is cooled as a result of being affected by the exterior atmosphere.

The temperature of the molten material just before forming the resinous particles or precursor from the molten material is measured at the position which is downstream of the means for melting the mixture, and also up stream of the inlet for supplying the molten material into the chamber. Here, the thermocouple or the like is disposed so as to directly contact with the molten material.

The supply pressure of the first gas flow is preferably 0.1 MPa to 2.0 MPa, more preferably 0.15 MPa to 1.5 MPa, and the most preferably 0.2 MPa to 0.8 MPa.

The resinous particles of the present invention are produced in accordance with the method for producing resinous particles of the present invention. The resinous particles of the present invention are expected to be applied in the various fields. For example, the resinous particles are applicable as particles for powder coatings which form a film at a low temperature, particles for bearing an aroma substance (essential oil substance) of a fragrance having a sustained releasing property, particles containing a drug for a drag delivery which has a sustained releasing property or releases the contained substance at a certain site, a toner containing additives such as wax for low-temperature fixing and oil-free fixing, and the like.

In the case where the resinous particles of the present invention are used as a toner for electrophotography, the temperature of the molten material just before forming the resinous particles or precursor is preferably 90° C. to 250° C., and more preferably 120° C. to 230° C. The temperature of the atmosphere where the resinous particles or precursor is formed is preferably 90° C. to 350° C., and more preferably 150° C. to 320° C. The temperature of the first gas flow is preferably 90° C. to 370° C., and more preferably 150° C. to 370° C. The temperature of the second gas flow is preferably 90° C. to 370° C., and more preferably 120° C. to 350° C. The temperature of the third gas flow is preferably −40° C. to 120° C., and more preferably −25° C. to 60° C. The temperature of the atmosphere where the formed resinous particles or precursor is kept is preferably 60° C. to 180° C., and more preferably 80° C. to 160° C. If the above-mentioned temperatures are higher than the above-mentioned ranges, the binder resin, additives, or other compositional materials of the toner may be deteriorated. If the above-mentioned temperatures are lower than the above-mentioned ranges, the wax may not be suitably encapsulated in the toner.

The resinous particles or precursor is formed from the molten material preferably by using the energy of the first gas flow, and the second and third gas flows may be introduced as required for controlling the temperature of the atmosphere where the formed resinous particles or precursor is kept. In order to increase the temperature of the atmosphere where the formed resinous particles or precursor is kept, the temperature or supplied rate of the first and second gas flows can be increased. Alternatively, it can be controlled by decreasing the temperature or supplied amount of the third gas flow.

The second gas flow is not required, if the heat quantity is sufficiently supplied by the first gas flow. For example, the utilization of the second gas flow is advantageous when the first gas flow cannot provide a sufficient heat quantity such as (1) when it is not preferable to increase the temperature of the first gas flow (for example, due to the deterioration of the additives), (2) when it is not preferably to increase the supplied rate of the first gas flow (for example, the control of the resinous particle diameter), (3) when the flow of the resinous particles or precursor along the flow of the first gas flow is not preferable (for example, the prevention of the attachment or fusion inside the chamber), (4) when the temperature or supplied rate of the first gas flow cannot be increased due to the design of the plant, or the like.

Since the toner of the present invention contains resinous particles of the present invention, such toner has an excellent image quality, especially durability, due to its structure encapsulating additives.

The binder resin for use in the toner of the present invention is not particularly limited, but suitable examples thereof include: monopolymers of styrene or substitution products of thereof, such as polystyrene, poly(p-chlorostyrene), polyvinyl toluene, and the like; styrene copolymers such as styrene-(p-chlorostyrene)copolymer, styrene-vinyltoluene copolymer, styrene-vinylnaphthalene copolymer, styrene-acrylic ester copolymer, styrene-methacrylic ester copolymer, styrene-(α-methyl chloromethacrylate) copolymer, styrene-acrylonitrile copolymer, styrene-vinylmethylether copolymer, styrene-vinylethylether copolymer, styrene-vinylmethylketone copolymer, styrene-butadiene copolymer, styrene-isoprene copolymer, styrene-acrylonitrile-indene copolymer; polyvinyl chloride; phenol resins; naturally modified phenol resins; maleic resins modified with natural resins; acrylic resins; methacrylic resins; polyvinyl acetate; silicone resins; polyester resins; polyurethane; polyamide resins; furan resins; epoxy resins; xylene resins; polyvinyl butyral; terpene resins; coumaroneindene resins; petroleum resins; and the like. Among these, the styrene copolymers or polyester resins are preferable.

In the toner of the present invention, at least one additive having a melting point lower than $T1/2$ of the binder resin preferably contains wax. The wax is used for maintaining the low temperature fixing properties and releasing ability. The wax is appropriately selected without any restriction. Examples of the wax include wax containing carbonyl groups, polyolefin wax, long-chain hydrocarbon, and the like. Among these, the wax containing carbonyl groups is preferable.

Examples of the wax containing carbonyl groups include polyalkanoic acid ester, polyalkanol ester, polyalcanoic acid amide, polyalkylamide, dialkyl keone, and the like. Among these, polyalkanoic acid ester is preferable. Examples of polyalkanoic acid ester include carnauba wax, montan wax, trimethylolpropane tribehenate, pentaerythritol tetrabehenate, pentaerythritol diacetate dibehenate, glycerin tribehenate, and 1,18-octadecanediol distearate. Examples of polyalkanol ester include tristearyl trimellitate, and distearyl maleate. Examples of polyalkanoic acid amide include dibehenylamide. Examples of polyalkyl amide include tristearylamide tmmellite. Examples of dialkyl ketone include distearyl ketone.

Examples of the polyolefin wax include polyethylene wax, polypropylene wax, and the like.

Examples of the long-chain hydrocarbon include paraffin wax, SASOL wax, and the like.

The melting point of the wax is appropriately adjusted depending on the intended purpose, without any restrictions. The melting point of the wax is preferably 40° C. to 160° C., more preferably 50° C. to 120° C., most preferably 60° C. to 90° C.

In the case where the melting point of the wax is lower than 40° C., the heat resistant stability of the wax may be reduced. In the case where the melting point of the wax is higher than 160° C., it is likely to cause cold offset during a low-temperature fixing process.

The toner of the present invention preferably has a surface wax amount of 0.65% by weight to 4.2% by weight, more preferably 2% by weight to 3% by weight. In the case where the surface wax amount is within the above-mentioned range, the toner has excellent heat resistant stability, low temperature fixing properties, and hot offset resistance, and also is prevented from filming to a developing roller or fusion to a member such as a blade which reduces a thickness of a toner layer. As a result, excellent and stable developing properties can be attained even when a developing device is used for a long period of time, and thus high quality images can be formed. Note that "surface wax" denotes the wax which extrudes from the toner at the time when the toner is stirred in an organic solvent which dissolves the wax, but not the binder resin.

In the case where the surface wax amount is less than 0.65% by weight, the releasing ability is lowered, and a problem may arise in the low temperature fixing properties. Moreover, the fixing property may be lowered at the time when the toner is fixed onto a paper. In the case where the surface wax amount is more than 4.2% by weight, the large amount of wax is exposed on the surface of the toner, and thus filming may be caused on a photoconductor, or the toner used in a one-component developer may be adhered to a blade which reduce a thickness of a toner layer on a developing sleeve.

In the case where the surface wax amount is in the range of from 0.65% by weight to 4.2% by weight, fine pores are formed on the surface of the toner as a result that the surface wax is extruded at the time of fixing, and these pores become passes for the inner wax to extrude, and thus the extrusion of the wax is encouraged.

In the present invention, the surface wax amount [% by weight] is determined by the following formula:

$$(TW-TW')/TW \times 100$$

In the formula above, TW denotes a total amount of the wax [% by weight] in the toner, TW' denotes an amount of the wax [% by weight] in the toner in which the surface wax is removed by extracting with a solvent.

TW is determined by the following formula in accordance with differential scanning calorimetry (DSC), for example by means of DSC60 (manufactured by Shimadzu Corporation):

$$TW = \text{(endothermic value of the wax in the toner)}/\text{(endothermic value of the wax itself)} \times 100$$

The specific measuring method of TW is explained hereinafter. First of all, approximately 5 mg of the toner is loaded in a sample container made of aluminum, the sample container is placed on a holder unit, and then is set in an electric furnace. The sample is heated by elevating the temperature from the room temperature to 150° C. at 10° C./min., the sample is left at 150° C. for 10 minutes, and the sample is then cooled down to the room temperature and left for 10 minutes. Thereafter, the sample is heated in a nitrogen gas atmosphere by elevating the temperature to 150° C. at the temperature increase rate of 10° C./min., and a DSC curve is measured, and an endothermic value [J/g] of the wax in the toner is calculated. In addition, an endothermic value [J/g] of the wax itself is calculated by using approximately 5 g of the wax in the same manner.

TW' is determined in accordance with DSC, in the same way as TW. The specific measuring method of TW' is explained hereinafter. 1.00 g of the toner is weighted and placed in a 30 ml screw tube. Thereafter, 7.0 ml of a solvent is measured and taken by a volumetric pipette and is dropped into each screw tube. The screw tube is agitated for 1 minute at 120 rpm by means of a roller. The mixture of the organic solvent and the toner is filtered, and the filtered product is dried for 5 minutes by means of a vacuum dryer. After drying, this is sufficiently cooled in a desiccator, and an endothermic value [J/g] of the wax in the toner is calculated in accordance with DSC. As the solvent for use in extraction, it can be used an organic solvent which dissolves the wax, but not the binder resin, such as hexane.

The toner of the present invention preferably contains a coloring agent, a charge controlling agent, and the like.

The coloring agent for use in the toner of the present invention can be selected from dyes and pigments known in the art, and two or more thereof can be used in combination. Examples of the dye include C.I. Solvent Yellow (6, 9, 17, 31, 35, 100, 102, 103, 105), C.I. Solvent Orange (2, 7, 13, 14, 66), C.I. Solvent Red (5, 16, 17, 18, 19, 22, 23, 143, 145, 146, 149, 150, 151, 157, 158), C.I. Solvent Violet (31, 32, 33, 37), C. I. Solvent Blue (22, 64, 78, 83-86, 91, 94, 95, 104), C.I. Solvent Green (24, 25), and C.I. Solvent Brown (3, 9), all of which are presented in color indexes. Examples of the commercially available dye include: Aizome SOT dyes Yellow-1,3,4, Orange-1,2,3, Scarlet-1, Red-1,2,3, Brown-2, Blue-1, 2, Violet-1, Green-1,2,3, and Black-1, 4, 6, 8, all manufactured by Hodogaya Chemical Co., Ltd.; Sudan dyes Yellow-146, 150, Orange-220, Red-290, 380, 460, and Blue-670, all manufactured by BASF Japan Ltd.; Diaresin Yellow-3G, F, H2G, HG, HC, HL, Orange-HS, G, Red-GG, S, HS, A, K, $H_5B$, Violet-D, Blue-J, G, N, K, P, H3G, 4G, Green-C, and Brown-A, all manufactured by Mitsubishi Chemical Corporation; Oil colors Yellow-3G, GS-S, #502, Blue-BOS, IIN, and Black-HBB, #803, EB, EX, all manufactured by Oritent Chemical Industries, Ltd.; Sumiplus Blue GP, OR, Red FB, 3B, and Yellow FL7G, GC manufactured by Sumitomo Chemical Co., Ltd.; and Kayaron Polyester Black EX-SF300, Kayaset Red-B, and Blue A-2R, all manufactured by Nippon Kayaku Co., Ltd.

Examples of the pigment include: inorganic pigments such as chrome yellow, zinc yellow, barium yellow, cadmium yellow, zinc sulfide, antimony white, cadmium red, barium sulfate, zinc sulfate, strontium sulfate, zinc oxide, titanium white, iron red, iron black, chrome oxide, aluminum hydroxide, calcium silicate, ultramarine blue, calcium carbonate, magnesium carbonate, carbon black, graphite, aluminum powder, bronze powder, and the like; and organic pigments such as Madder Lake, Rockwood Lake, Cochineal Lake, Naphthol Green B, Naphthol Green Y, Naphthol Yellow S, Lithol Fast Yellow 2G, Permanent Red 4R, Brilliant Fast Scarlet, Hansa Yellow, Lithol Red, Lake Red C, Lake Red D, Brilliant Carmine 6B, Permanent Red F5R, Pigment Scarlet 3B, Bordeaux 10B, Phthalocyanine Blue, Phthalocyanine Green, Sky Blue, Rhodamine Lake, Malachite Green Lake, Eosin Lake, Quinoline Yellow Lake, Indanthrene Blue, Thio-indigo Maroon, Alizarin Lake, Quinacridone Red, Quinacridone Violet, Perylene Red, Perylene Scarlet, Isoindolinone Yellow, Dioxygen Violet, Aniline Black, and the like.

The charge controlling agent is appropriately selected from those known in the art depending on the purpose, without any restrictions. However, colorless materials or materials having a color close to white are preferable. Examples thereof include a triphenylmethane dye, a molybdic acid chelate pigment, a rhodamine dye, alkoxy amine, a quaternary ammonium salt (including fluoride-modified quaternary ammonium salt), alkylamide, phosphous or a compound thereof, tungsten or a compound thereof, a fluoride activator, a metal salt of salicylic acid, and a metal salt of a salicylic acid derivative. These may be used singly or in combination of two or more.

For the charge controlling agent, commercially available products may be used. Examples thereof include: Bontron P-51 which is a quaternary ammonium salt, Bontron E-82 which is an oxynaphthoic acid metal complex, Bontron E-84 which is a salicylic acid metal complex, and Bontron E-89 which is a phenol condensate (manufactured by Orient Chemical Industries, Ltd.); TP-302 and TP-415, both are a quaternary ammonium salt molybdenum metal complex (manufactured by Hodogaya Chemical Co.); Copy Charge PSY VP2038 which is a quaternary ammonium salt, Copy Blue PR which is a triphenylmethane derivative, and Copy Charge NEG VP2036 and Copy Charge NX VP434, both of which are a quaternary ammonium salt (manufactured by Hoechst Ltd.); LRA-901 and LR-147 which are boron metal complexes (manufactured by Japan Carlit Co., Ltd.); quinacridones; azo pigments; high-molecular weight compounds bearing a functional group (e.g., sulfonic group and carboxyl group); and the like.

The toner of the present invention optionally contains magnetic material such as magnetite, ferrite, iron oxide, and the like, and such the toner can be used as a magnetic toner.

The toner of the present invention preferably contains at least one kind of particles having a volume average particle diameter which is 1/1000 to 1/10 of the volume average particle diameter of the resinous particles. These particles can be appropriately selected from those known in the art without any restrictions. Examples thereof include conventional resinous particles, silica, alumina, titanium oxide, barium titanate, magnesium titanate, calcium titanate, strontium titanate, zinc oxide, tin oxide, silica sand, clay, mica, wollastonite, silious earth, chrome oxide, cerium oxide, iron oxide, antimony trioxide, magnesium oxide, zirconium oxide, barium sulfate, barium carbonate, calcium carbonate, silicon carbonate, silicon nitrite, and the like.

The particles preferably have a primary particle diameter of 5 nm to 2 μm, more preferably 5 nm to 50 nm. Moreover, the particles preferably have a specific surface area of 20 $m^2/g$ to 500 $m^2/g$ according to a BET method.

The content of the particles in the toner is preferably 0.01% by weight to 5.0% by weight.

In the present invention, the particle size distribution can be measured, for example, in accordance with a Coulter counter method. Examples of a measuring device for the particle size distribution according to the Coulter counter method include Coulter Counter TA-II, and Coulter Multisizer II (both manufactured by Beckman Coulter K.K.). The specific method for measuring the particle size distribution is described hereinafter. 0.1 ml to 5 ml of a surfactant (preferably polyoxyethylene alkylether) as a dispersant is added into 100 ml to 150 ml of electrolyte. The electrolyte is an approximately 1% by weight NaCl aqueous solution prepared by using a primary sodium chloride. Examples of the electrolyte include ISO-TON-II manufactured by Beckman Coulter K.K., and the like. Thereafter, the suspension in which 2 mg to 20 mg of a sample is added is subjected with a dispersion treatment by means of an ultrasonic disperser for about 1 to 3 minutes, and then the volume and number of the toner are measured by using a 100 μm aperture. In this manner, the volume distribution and number distribution can be obtained. The volume average particle diameter and number average particle diameter of the toner are obtained from the obtained distributions. As channels, thirteen channels of: 2.00 μm or more to less than 2.52 μm; 2.52 μm or more to less than 3.17 μm; 3.17 μm or more to less than 4.00 μm; 4.00 μm or more to less than 5.04 μm; 5.04 μm or more to less than 6.35 μm; 6.35 μm or more to less than 8.00 μm; 8.00 μm or more to less than 10.08 μm; 10.08 μm or more to less than 12.70 μm; 12.70 μm or more to less than 16.00 μm; 16.00 μm or more to less than 20.20 μm; 20.20 μm or more to less than 25.40 μm; 25.40 μm or more to less than 32.00 μm; and 32.00 μm or more to less than 40.30 μm, are used, and the particles having a particle diameter of 2.00 μm or more to less than 40.30 μm are targeted.

The toner preferably has the volume average particle diameter of 3 μm to 20 μm, more preferably 3 μm to 10 μm, and the most preferably 3 μm to 8 μm. A ratio (volume average particle diameter/number average particle diameter) of the volume average particle diameter to the number average particle diameter is preferably 1.0 to 1.5, more preferably 1.0 to 1.3, and the most preferably 1.05 to 1.3.

The toner of the present invention is produced, for example, by the following flow.
1. A step of mixing the binder resin, the wax (additive), and other materials to prepare a mixture.
2. A step of melting the mixture to prepare a molten material.
3. A step of increasing a specific surface of the molten material in a high temperature atmosphere.
4. A step of cooling.
5. A step of insulation.
6. A step of correction.
7. A step of classification.

In the steps above, the operations are carried out as follow in order to control the dispersion state of the wax. By using the wax having the melting point lower than T1/2 of the binder resin, the wax present in an area adjacent to the surface of the toner is shift to the inner area of the toner in the step of 4, and thus the wax is encapsulated in the toner. In the case where the dispersion diameter of the wax needs to be large, dispersion grains of the wax are grown by prolonging the duration for retaining the molten material in the high temperature atmosphere in the step of 3. Note that, the steps of 1 and 2 can be operated as a single step or two separate steps. For example, the materials can be mixed by means of a conventional powder mixer, and then the mixture is separately melted. Alternatively, the material can be melt-kneaded by mixing while melting by means of a conventional fuser or the like. However, it is preferable that the mixture is melt-kneaded after mixing the materials by means of the powder mixer. In the case where the dispersion diameter of the wax in the melted state is larger than a particle diameter of the toner to be produced in the step of 2, the specific surface area cannot be increased while uniformly maintaining the compositions of each toner particles. The steps of 6 and 7 are either steps which originally do not affect on the particle structure of the toner, or steps which may affect on the particle structure of the toner when the processing temperature for the steps is Tg of the binder resin or higher. The step of 7 is not necessary, but can be operated if it is necessary to control the particle diameter of the toner. For example, this step is used for removing coarse or fine particles.

The developer of the present invention contains at least the toner of the present invention, and further contains appropriately selected other substances, such as carrier. The developer is either a one-component developer or a two-component developer. When it is applied to high-speed printers that support increasing information processing rates of recent years, a two-component developer is preferable in view of achieving an excellent shelf life.

In the case of a one-component developer containing the toner of the present invention, the variations in the toner particle diameter are minimized even after consumption or addition of toner, and toner filming to a developing roller and toner adhesion to members (e.g., blade) due to its reduced layer thickness are prevented. Thus, it is possible to provide excellent and stable developing properties and images even after a long time usage of the developing unit (i.e., after long time agitation of developer). Meanwhile, in the case of a two-component developer containing the toner of the present invention, even after many cycles of consumption and addition of toner, the variations in the toner particle diameter are minimized and, even after a long time agitation of the developer in the developing unit, excellent and stable developing properties may be obtained.

The carrier can be appropriately selected depending on the purpose without any restrictions. The carrier is preferably selected from those having a core material and a resin layer coating the core material.

The core material is appropriately selected from those know in the art, without any restrictions. For example, materials based on manganese-strontium (Mn—Sr) of 50 emu/g to 90 emu/g and materials based on manganese-magnesium (Mn—Mg) are preferable. From the standpoint of securing image density, high magnetizing materials such as iron powder (100 emu/g or more) and magnetite (75 emu/g to 120 emu/g) are preferable. In addition, weak magnetizing materials such as copper-zinc (Cu—Zn)-based materials (30 emu/g to 80 emu/g) are preferable from the standpoint for achieving higher-grade images by reducing the contact pressure against the photoconductor having standing toner particles. These materials may be used singly or in combination of two or more.

The volume average particle diameter ($D_{50}$) of the core material is preferably 10 μm to 200 μm, more preferably 40 μm to 100 μm. If the average particle diameter (volume average particle diameter ($D_{50}$)) is less than 10 μm, fine particles make up a large proportion of the carrier particle distribution, causing carrier splash due to reduced magnetization per one particle in some cases; on the other hand, if it exceeds 200 μm, the specific surface area of the particle decreases, causing toner splashes and reducing the reproducibility of images, particularly the reproducibility of solid-fills in full-color images.

The material of the resin layer is appropriately selected from those known in the art, without any restrictions. Examples thereof include an amino resin, a polyvinyl resin, a polystyrene resin, a halogenated olefin resin, a polyester resin, a polycarbonate resin, a polyethylene resin, a polyvinyl fluoride resin, a polyvinylidene fluoride resin, a polytrifluoroethylene resin, a polyhexafluoropropylene resin, a copolymer of vinylidene fluoride and acrylic monomers, a copolymer of vinylidene fluoride and vinyl fluoride, fluoroterpolymer such as terpolymer of tetrafluoroethylene, vinylidene fluoride and non-fluoride monomers, and a silicone resin. These resins may be used singly or in combination of two or more.

Examples of the amino resin include a urea-formaldehyde resin, a melamine resin, a benzoguanamine resin, a urea resin, a polyamide resin, and an epoxy resin. Examples of the polyvinyl resin include an acrylic resin, a polymethyl methacrylate resin, a polyacrylonitrile resin, a polyvinyl acetate resin, a polyvinyl alcohol resin, and a polyvinyl butyral resin. Examples of the polystyrene resin include a polystyrene resin, and a styrene-acryl copolymer resin. Examples of the halogenated olefin resin include polyvinyl chloride. Examples of the polyester resin include a polyethylene terephthalate resin, and a polybutylene terephthalate resin.

The resin layer may contain such material as conductive powder depending on the application; for the conductive powder, metal powder, carbon black, titanium oxide, tin oxide, zinc oxide, and the like are exemplified. These conductive powders preferably have an average particle diameter of 1 μm or less. If the average particle diameter is greater than 1 μm, it may be difficult to control electrical resistance.

The resin layer may be formed by dissolving the silicone resin or the like into a solvent to prepare a coating solution, uniformly coating the surface of the core material with the coating solution by a known coating process, and dying and baking the core material. Examples of the coating process include immersing process, spray process, and brush painting process.

The solvent is not particularly limited and cab be appropriately selected depending on the intended purpose. Examples thereof include toluene, xylene, methyl ethyl ketone, methyl isobutyl ketone, cellusolve, and butylacetate.

The baking process may be an externally heating process or an internally heating process, and can be selected from, for example, a process using a fixed type electric furnace, a fluid type electric furnace, a rotary type electric furnace or a burner furnace, and a process using microwave.

The content of the resin layer in the carrier is preferably 0.01% by weight to 5.0% by weight. In the case where the content is less than 0.01% by weight, it may be difficult to form a uniform resin layer on the surface of the core material, on the other hand, in the case where the content is more than 5.0% by weight, the resin layer becomes so thick that carrier particles may associate together. Thus, it may result in failure to obtain uniform carrier particles.

The content of the carrier in the two-component developer is preferably 90% by weight to 98% by weight, more preferably 93% by weight to 97% by weight. A mixing ratio of the toner and carrier is preferably 1 part by weight to 10 parts by weight of the toner with respect of 100 parts by weight of the carrier.

The developer of the present invention is capable of stable forming a high quality and highly clear images without image unevenness, while preventing the filming to the photoconductor. The developer can be suitably applied to a variety of known electrophotographic image formation processes including a magnetic one-component developing process, non-magnetic one-component developing process, and two-component developing process, particularly to a toner container, process cartridge, image forming apparatus and image forming method of the present invention, all of which will be described below.

The toner container for use in the present invention contains a container, and the toner and/or developer of the present invention loaded in the container. By loading the toner of the present invention in the container, the toner container can be supplied for users separately from an image forming apparatus body itself.

The container is appropriately selected from the conventional contains depending on the purpose without any restrictions. Examples thereof include a container containing a body of the toner container and a cap, and the like.

The size, shape, structure, material and several features of the body of the toner container is not particularly limited, and can be appropriately determined depending on the intended purpose. For example, the body of the toner container preferably has a cylindrical shape, most preferably a cylindrical shape in which spiral grooves are formed on its inner surface that allow toner in the container to shift to the outlet along with rotation of the main body, and in which all or part of the spiral grooves have a bellow function.

Materials for the body of the toner container are not particularly limited, and are preferably those capable of providing accurate dimensions when fabricated. Examples thereof include resins, and the like. Among the resins, for example, polyester resins, polyethylene resins, polypropylene resins, polystyrene resins, polyvinyl chloride resins, polyacrylic acid resins, polycarbonate resins, ABS resins, and polyacetal resins are suitable.

The toner container can be readily stored and transferred, and is easy to handle. The toner container can be suitably used to supply toner by detachably attaching it to a process cartridge, image forming apparatus or the like to be described later.

The process cartridge for use in the present invention contains at least a latent electrostatic image bearing member configured to bear a latent electrostatic image thereon, and a developing unit configured to develop the latent electrostatic image formed on the latent electrostatic image bearing member using a developer so as to form a visible image, and may further contain a charging unit, a transferring unit, a fixing unit, a cleaning unit, a discharging unit, and the like, if necessary.

The developing unit contains at least a developer container for storing the toner or developer of the present invention, and a developer carrier for carrying and transferring the toner or developer stored in the developer container, and may further contain a layer-thickness control member for controlling the thickness of the layer of the toner to be carried.

The process cartridge can be detachably disposed in an image forming apparatus of various electrophotographic systems, and is preferably disposed in the image forming apparatus for use in the present invention, which is described later.

Figure 9:
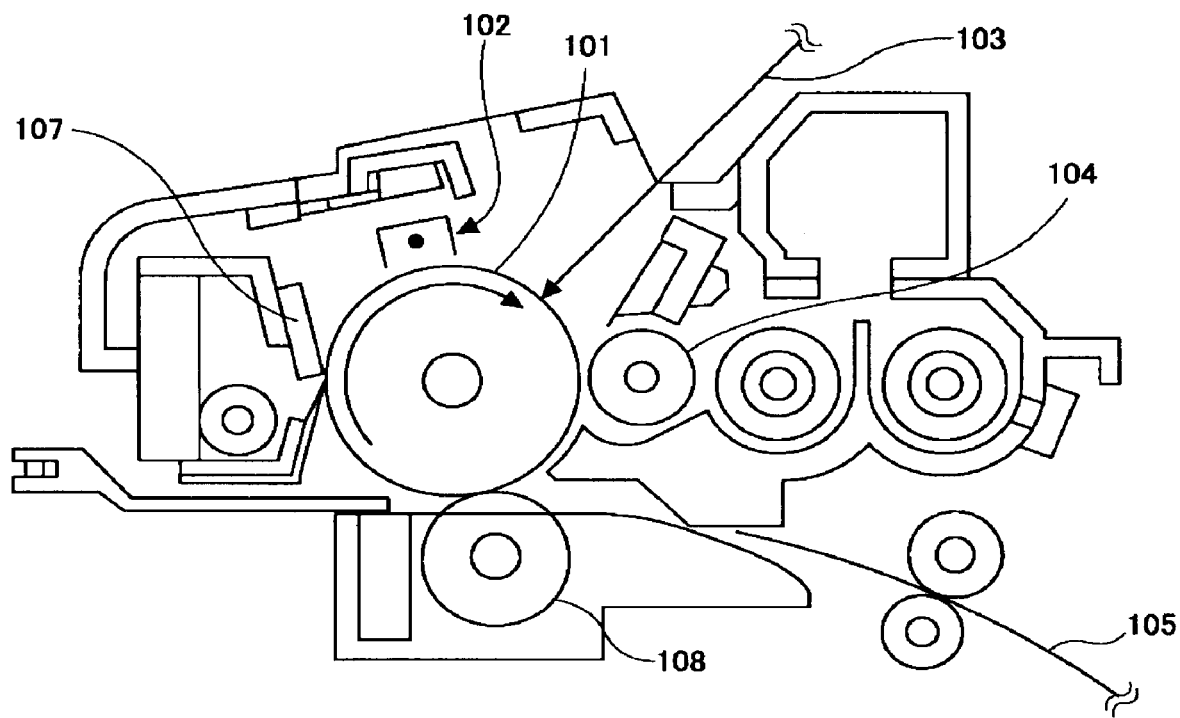
FIG. 9 is a schematic diagram showing an example of a process cartridge of the present invention.

The process cartridge contains, for example, as shown in FIG. 9, a built-in latent electrostatic image bearing member 101, a charging unit 102, a developing unit 104, a transferring unit 108, and a cleaning unit 107 and, if necessary, further contains additional unit(s). In FIG. 9, 103 denotes exposure light emitted from an exposing unit, and 105 denotes a recording medium.

As the photoconductor 101, a photoconductor having the same embodiment to the one used for the below-mentioned image forming apparatus can be used. The charging unit 102 is appropriately selected from charging members.

Next, an image formation process by means of the process cartridge shown in FIG. 9 will be described.

The latent electrostatic image bearing member 101 rotates in the direction of the arrow, charged by means of the charging unit 102 and is irradiated with the exposure light 103 by means of an exposing unit (not shown), whereby a latent electrostatic image corresponding to the exposed image is formed thereon. This electrostatic image is developed by means of the developing unit 104, and the resultant visible image is transferred to the recording medium 105 by means of the transferring unit 108. The recording medium 105 is then printed out. Subsequently, the surface of the latent electrostatic image bearing member 101 is cleaned by means of the cleaning unit 107, and any charges remained are removed by means of a charge-removing unit (not shown). This whole process is continuously repeated.

The image forming apparatus of the present invention contains a process cartridge which integrally equips the compositional units such as a latent electrostatic image bearing member, a developing unit, a cleaning unit and the like. The process cartridge may be detachably disposed in the body of the image forming apparatus. Moreover, a latent electrostatic image bearing member and at least one selected from a charging unit, an image exposing unit, a developing unit, a transferring or separating unit and a cleaning unit are integrally supported to compose a process cartridge which is attachable to and detachable from the body of the image forming apparatus, and the process cartridge can be detachably disposed in the body of the image forming apparatus by using a guide such as a rail disposed in the body of the image forming apparatus.

The image forming apparatus of the present invention contains at least a latent electrostatic image bearing member, a latent electrostatic image forming unit, a developing unit, a transferring unit, and a fixing unit, and optionally contains a discharging unit, a cleaning unit, a recycling unit, a controlling unit, and the like, as required.

The image forming method of the present invention contains a latent electrostatic image forming step, a developing step, a transferring step and a fixing step, and may further contain other step(s) such as a charge removing step, a cleaning step, a recycling step and a controlling step, which are optionally selected as needed.

The image forming method of the present invention can be carried out by means of the image forming apparatus of the present invention. Namely, the latent electrostatic image forming step is carried out by means of the latent electrostatic image forming unit, the developing step is carried out by means of the developing unit, the transferring step is carried out by means of the transferring unit, and the fixing step is carried out by means of the fixing unit. The same can be applied in other steps.

The latent electrostatic image forming step is a step of forming a latent electrostatic image on a latent electrostatic image bearing member.

The material, shape, size, structure, and several features of the latent electrostatic image bearing member (referred to as "photoconductor," "electrographic photoconductor," or "image bearing member" in some cases) are not particularly limited. The latent electrostatic image bearing member can be appropriately selected from those known in the art. Suitable examples of the shape thereof include a drum shape, and the like. Suitable examples of the material thereof include inorganic photoconductive materials such as amorphous silicon and selenium, and organic photoconductive materials such as polysilane and phthalopolymethine. Among these, amorphous silicon is preferable in view of its long life.

As the amorphous silicon photoconductor, a photoconductor which is formed by heating a support at 50° C. to 400° C., and forming a photoconductive layer containing amorphous silicone on the support in accordance with a film forming method such as a vacuum deposition method, a sputtering method, an ion-plating method, a heat-CVD (chemical vapor deposition) method, a photo-CVD method, a plasma-CVD method, or the like. Among these, it is preferable to form a deposited layer of amorphous silicone on the support in accordance with the plasma-CVD method, namely by decomposing a raw material gas by glow discharge of direct current, high frequency wave, or micro wave.

The formation of the latent electrostatic image is carried out by, for example, exposing the latent electrostatic image bearing member imagewise after equally charging its entire surface. This step is performed by means of the latent electrostatic image forming unit.

The latent electrostatic image forming unit contains a charging device configured to equally charge the surface of the latent electrostatic image bearing member, and an exposing device configured to expose the surface of the latent electrostatic image bearing member imagewise.

The charging is carried out by, for example, applying voltage to the surface of the latent electrostatic image bearing member by means of the charger.

The charger can be appropriately selected depending on the intended purpose without any restrictions. Examples thereof include known contact-chargers equipped with a conductive or semiconductive roller, blush, film or rubber blade; and known non-contact-chargers utilizing corona discharge such as corotron or scorotoron.

As the charger, a magnetic brush, a fur brash, or the like can be used. The charger can be selected depending on the specification or embodiment of the image forming apparatus. The magnetic brush is, for example, consisted of ferrite particles such as Zn—Cu ferrite, a non-magnetic conductive sleeve which supports the ferrite, and a magnet roll which is covered with the conductive sleeve. The fur brush is, for example, the one wherein fur which is conductively treated with carbon, cupper sulfate, metal or metal oxide is coiled around or attached to a core metal or a conductive-treated core.

The charger for use in the present invention is not particularly restricted, but the contact-charger is preferable in view of that an image forming apparatus wherein an amount of ozone generated from the charger is decreased is obtained.

The exposing is carried out by, for example, exposing the surface of the latent electrostatic image bearing member imagewise by means of an exposing unit.

The exposing unit is not particularly limited as long as it is capable of performing image-wise exposure on the surface of the charged latent electrostatic image bearing member by means of the charging device, and is appropriately selected depending on the intended use. Examples thereof include various exposing devices, such as optical copy devices, rod-lens-eye devices, optical laser devices, and optical liquid crystal shatter devices.

Note in the present invention that a backlight system may be employed for exposure, where image-wise exposure is performed from the back side of the latent electrostatic image bearing member.

The developing step is a step of developing the latent electrostatic image using the toner of developer of the present invention to form a visible image.

The formation of the visible image can be carried out, for example, by developing the latent electrostatic image using the toner or developer of the present invention. This is performed by means of the developing unit.

The developing unit can appropriately selected from known developing units depending on the purpose without any restriction, provided that it is capable of developing using the toner or developer of the present invention. Suitable examples thereof include those having at least a developing device, which is capable of housing the toner developer of the present invention therein, and is capable of directly or indirectly applying the toner or developer to the latent electrostatic image. A developing device equipped with the toner container is more preferable.

The developing device may be of dry developing type or wet developing type, and may be designed either for monochrome or multiple-color. Suitable examples thereof include those having an agitation unit for agitating the toner or developer to provide electrical charges by frictional electrification, and a rotatable magnet roller.

In the developing device, the toner and carrier are mixed together and the toner is charged by friction, allowing the rotating magnetic roller to bear toner particles in such a way that they stand on its surface. In this way a magnetic blush is formed. Since the magnet roller is arranged in the vicinity of the latent electrostatic image bearing member (photoconductor), some toner particles on the magnetic roller that constitute the magnetic blush electrically migrate to the surface of the latent electrostatic image bearing member (photoconductor). As a result, a latent electrostatic image is developed by means of the toner, forming a visible image, or a toner image, on the surface of the latent electrostatic image bearing member (photoconductor).

The developer contained in the developing device is a developer containing the toner of the present invention. The developer may be either a one-component developer or a two-component developer.

The transferring step is a step of transferring the visible image onto a recording medium. A preferred embodiment of transferring involves two steps: primary transferring in which the visible image is transferred onto an intermediate transferring member; and secondary transferring in which the visible image transferred onto the intermediate transferring member is transferred onto a recording medium. A more preferable embodiment of transferring involves two steps: primary transferring in which a visible image is transferred onto an intermediate transferring member to form a complex image thereon by means of toners of two or more different colors, preferably full-color toners; and secondary transferring in which the complex image is transferred onto a recording medium.

The transferring step is carried out by, for example, charging the latent electrostatic image bearing member (photoconductor) by means of a transfer charging unit. This transferring step is performed by means of the transferring unit. A preferable embodiment of the transferring unit has two units: a transferring unit configured to transfer a visible image onto an intermediate transferring member to form a complex image; and a secondary transferring unit configured to transfer the complex image onto a recording medium.

The intermediate transferring member can be appropriately selected from conventional transferring media depending on the intended purpose, without any restrictions. Suitable examples thereof include a transferring belt, and the like.

The transferring unit (i.e., the primary and secondary transferring units) preferably contains a transferring device configured to charge and separate the visible image from the latent electrostatic image bearing member (photoconductor) and transfer it onto the recording medium. The number of the transferring unit to be disposed may be either one or more.

Examples of the transferring unit include a corona transferring device utilizing corona discharge, a transferring belt, a transferring roller, a pressure-transferring roller, and an adhesion-transferring device.

The recording medium can be appropriately selected from known recording media without any restrictions, provided that an unfixed image after developing can be transferred thereon. For example, normal paper is used as the recording medium, and a PET base for OHP or the like can be also used as the recording medium.

The fixing step is a step of fixing a transferred visible image onto the recording medium by means of the fixing unit. Fixing may be performed every time after each different toner has been transferred to the recording medium or may be performed in a single step after all different toners have been transferred to the recording medium.

The fixing device can be appropriately selected depending on the intended purpose, without any restrictions. Examples thereof include a heating-pressurizing unit, and the like. The heating-pressurizing unit is preferably a combination of a heating roller and a pressurizing roller, a combination of a heating roller, a pressurizing roller, and an endless belt, or the like.

In general, heating treatment by means of the heating-pressurizing unit is preferably performed at a temperature of 80° C. to 200° C.

Note in the present invention that a known optical fixing unit may be used in combination with or instead of the fixing step and fixing unit, depending on the intended purpose.

The charge removing step is a step of applying a bias to the charged electrographic photoconductor for removal of charges. This is suitably performed by means of the charge eliminating unit.

The charge removing unit can be appropriately selected from conventional charge eliminating units depending on the intended purpose without any restrictions, provided that it is capable of applying a charge removing bias to the latent electrostatic image bearing member. Suitable examples thereof include a charge removing lamp and the like.

The cleaning step is a step of removing toner particles remained on the latent electrostatic image bearing member. This is suitably performed by means of the cleaning unit. The cleaning unit can be suitably selected from conventional cleaners depending on the intended use without any restriction, provided that it is capable of removing such toner particles from the latent electrostatic image bearing member. Examples thereof include a magnetic blush cleaner, a electrostatic brush cleaner, a magnetic roller cleaner, a blade cleaner, a blush cleaner, a wave cleaner, and the like.

The recycling step is a step of recovering the toner particles removed through the cleaning step to the developing unit. This is suitably performed by means of the recycling unit.

The recycling unit can be appropriately selected from conventional conveyance systems, without any restrictions.

The controlling step is a step of controlling the foregoing steps. This is suitably performed by means of the controlling unit.

The controlling unit can be appropriately selected depending on the intended use without any restrictions, provided that the operation of each step can be controlled. Examples thereof include equipments such as a sequencer, a computer, and the like.

One embodiment of the image forming method of the present invention by means of the image forming apparatus will be described with reference to FIG. 10.

An image forming apparatus 100 shown in FIG. 10 contains a photoconductor drum 10 (hereinafter referred to as a photoconductor 10) as the latent electrostatic image bearing member, a charging roller 20 as the charging unit, an exposure device 30 as the exposing unit, a developing device 40 as the developing unit, an intermediate transferring member 50, a cleaning device 60 as the cleaning unit having a cleaning blade, and a charge removing lamp 70 as the charge removing unit.

The intermediate transferring member 50 is an endless belt, and is so designed that it loops around three rollers 51 disposed its inside and rotates in the direction shown by the arrow by means of the rollers 51. One or more of the three rollers 51 also functions as a transfer bias roller capable of applying a certain transfer bias (primary bias) to the intermediate transferring member 50. A cleaning blade 90 is provided adjacent to the intermediate transferring member 50. There is provided a transferring roller 80 next to the intermediate transferring member 50 as the transferring unit capable of applying a transfer bias so as to transfer a developed image (toner image) to a transfer sheet 95, a recording medium (secondary transferring). Moreover, there is provided a corona charger 58 around the intermediate transferring member 50 for applying charges to the toner image transferred on the intermediate transferring member 50. The corona charger 58 is arranged between the contact region of the photoconductor 10 and the intermediate transferring member 50 and the contact region of the intermediate transferring member 50 and the transfer sheet 95.

The developing device 40 comprises a developing belt 41 (a developer bearing member), a black developing unit 45K, yellow developing unit 45Y, magenta developing unit 45M and cyan developing unit 45C, the developing units being positioned around the developing belt 41. The black developing unit 45K comprises a developer container 42K, a developer supplying roller 43K, and a developing roller 44K. The yellow developing unit 45Y comprises a developer container 42Y, a developer supplying roller 43Y, and a developing roller 44Y. The magenta developing unit 45M comprises a developer container 42M, a developer supplying roller 43M, and a developing roller 44M. The cyan developing unit 45C comprises a developer container 42C, a developer supplying roller 43C, and a developing roller 44C. The developing belt 41 is an endless belt looped around a plurality of belt rollers so as to be rotatable. A part of the developing belt 41 is in contact with the latent electrostatic image bearing member 10.

Figure 10:
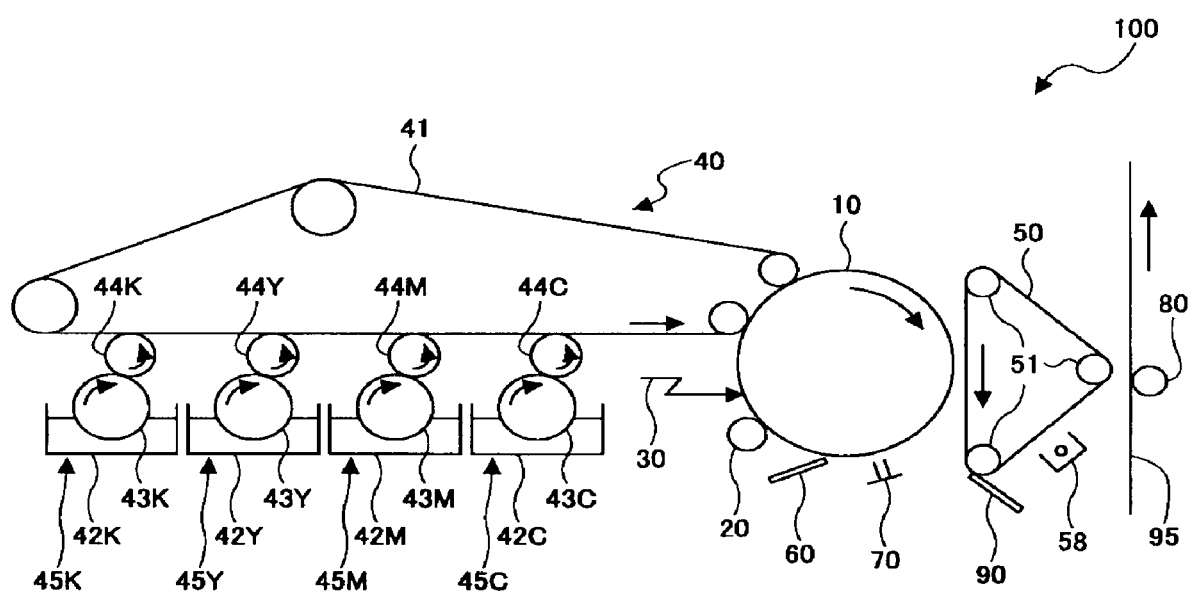
FIG. 10 is a schematic diagram showing a first example of an image forming apparatus of the present invention.

In the image forming apparatus 100 shown in FIG. 10, the photoconductor drum 10 is uniformly charged by means of, for example, the charging roller 20. The exposure device 30 then applies light to the photoconductor drum 10 so as to form a latent electrostatic image. The latent electrostatic image formed on the photoconductor drum 10 is provided with toner from the developing device 40 to form a visible image (toner image). The roller 51 applies a bias to the toner image to transfer the visible image (toner image) onto the intermediate transferring member 50 (primary transferring), and further applies a bias to transfer the toner image from the intermediate transferring member 50 to the transfer sheet 95 (secondary transferring). In this way a transferred image is formed on the transfer sheet 95. Thereafter, toner particles remained on the photoconductor drum 10 are removed by means of the cleaning device 60, and charges of the photoconductor drum 10 are removed by means of the charge removing lamp 70 on a temporary basis.

Figure 11:
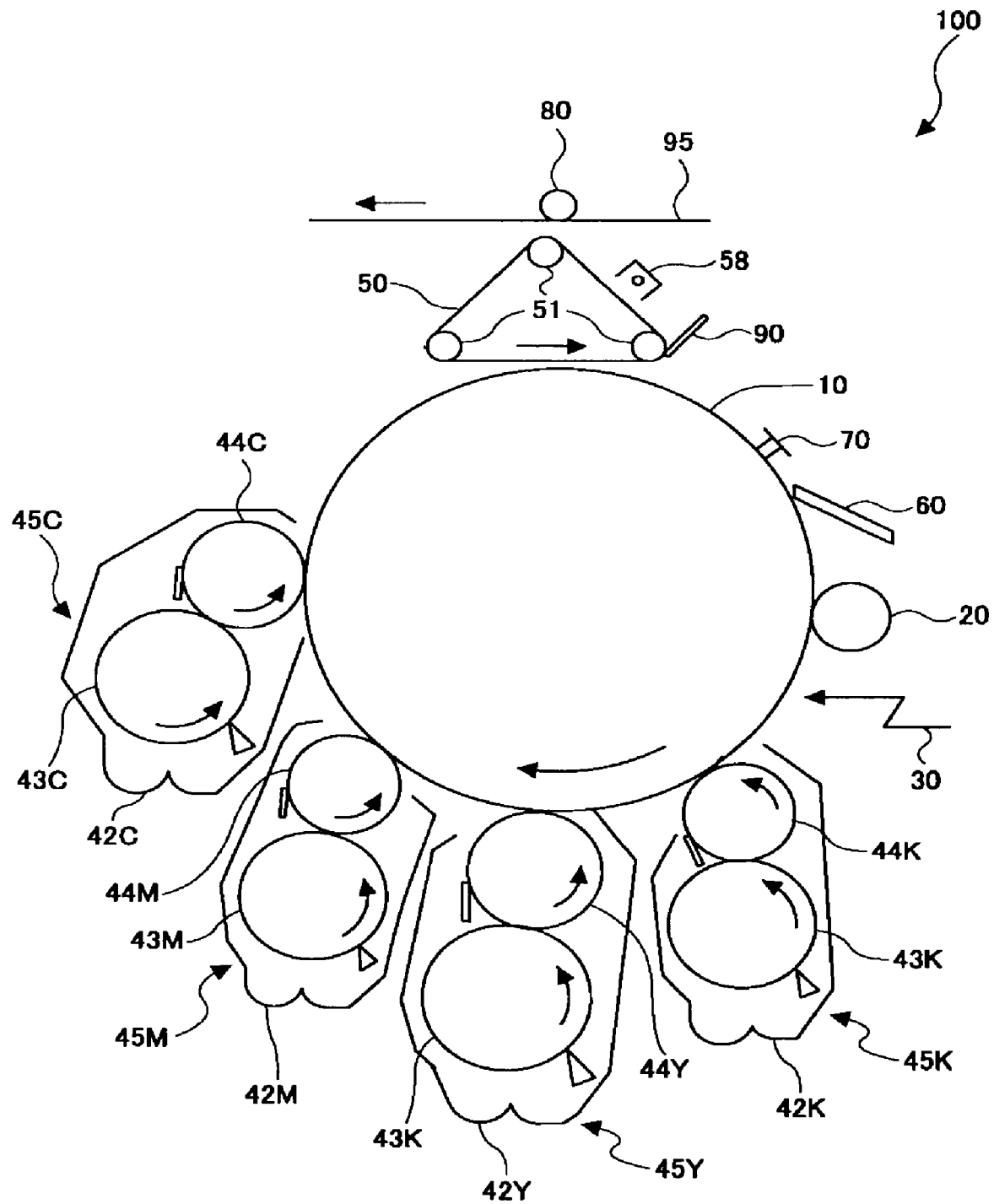
FIG. 11 is a schematic diagram showing a second example of an image forming apparatus of the present invention.

Another embodiment of the image forming method of the present invention by means of the image forming apparatus will be described with reference to FIG. 11. The image forming apparatus 100 shown in FIG. 11 has an identical configuration and working effects to those of the image forming apparatus 100 shown in FIG. 10 except that this image forming apparatus 100 does not comprise the developing belt 41 and that the black developing unit 45K, yellow developing unit 45Y, magenta developing unit 45M and cyan developing unit 45C are disposed around the periphery of the photoconductor 10. Note in FIG. 11 that members identical to those in FIG. 10 are denoted by the same reference numerals.

Figure 12:
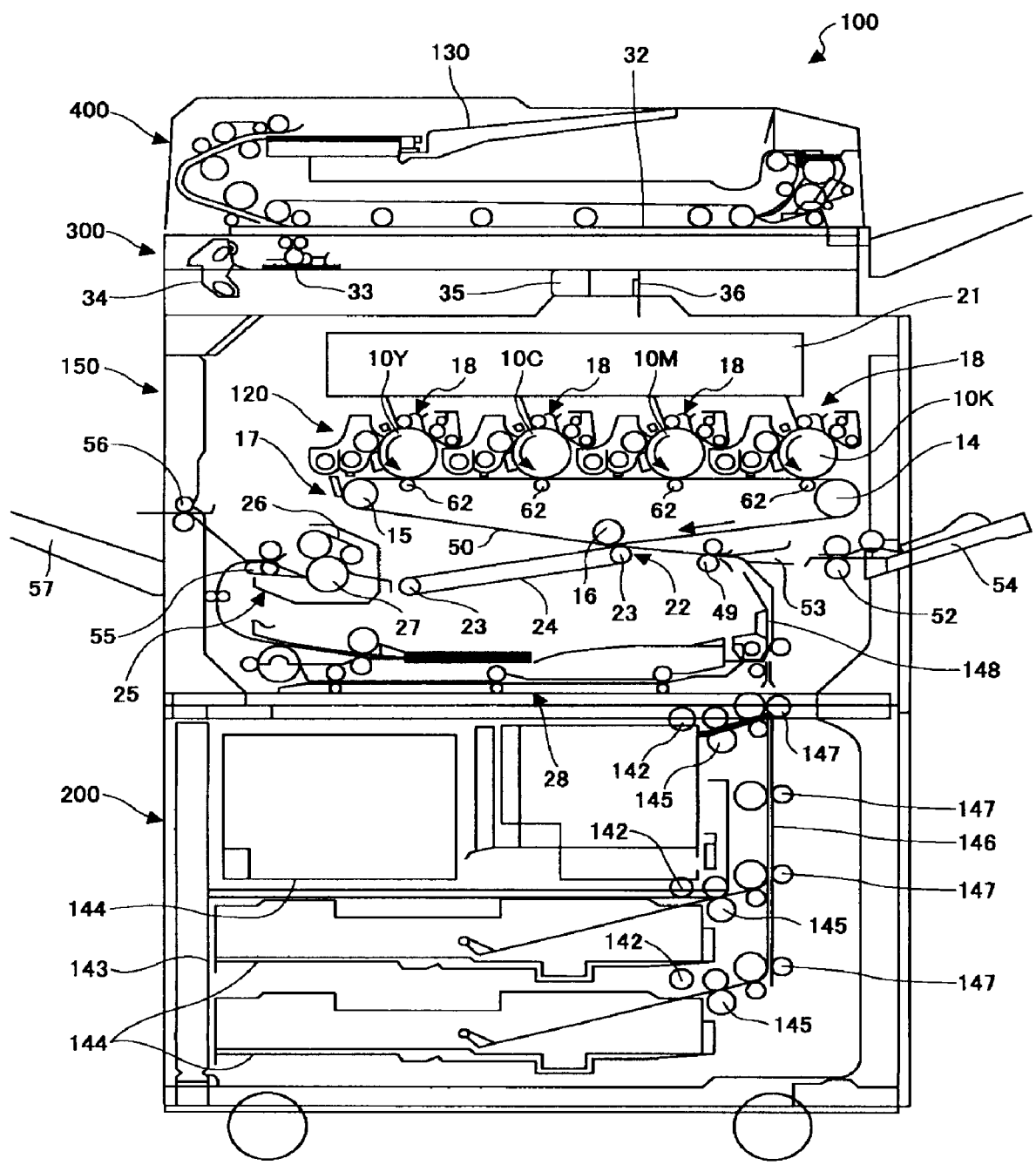
FIG. 12 is a schematic diagram showing a third example of an image forming apparatus of the present invention.

Still another embodiment of the image forming method of the present invention by means of the image forming apparatus will be described with reference to FIG. 12. An image forming apparatus 100 shown in FIG. 12 is a tandem color image-forming apparatus. The tandem image forming apparatus comprises a copy machine main body 150, a feeder table 200, a scanner 300, and an automatic document feeder (ADF) 400.

The copy machine main body 150 has an endless-belt intermediate transferring member 50 in the center. The intermediate transferring member 50 is looped around support rollers 14, 15 and 16 and is configured to rotate in a clockwise direction in FIG. 5. A cleaning device 17 for the intermediate transferring member is provided in the vicinity of the support roller 15. The cleaning device 17 removes toner particles remained on the intermediate transferring member 50.

On the intermediate transferring member 50 looped around the support rollers 14 and 15, four color-image forming devices 18—yellow, cyan, magenta, and black—are arranged, constituting a tandem developing unit 120. An exposing unit 21 is arranged adjacent to the tandem developing unit 120. A secondary transferring unit 22 is arranged across the intermediate transferring member 50 from the tandem developing unit 120. The secondary transferring unit 22 comprises a secondary transferring belt 24, an endless belt, which is looped around a pair of rollers 23. A paper sheet on the secondary transferring belt 24 is allowed to contact the intermediate transferring member 50. An image fixing device 25 is arranged in the vicinity of the secondary transferring unit 22. The image fixing device 25 comprises a fixing belt 26, an endless belt, and a pressurizing roller 27 which is pressed by the fixing belt 26.

In the tandem image forming apparatus, a sheet reverser 28 is arranged adjacent to both the secondary transferring unit 22 and the image fixing device 25. The sheet reverser 28 turns over s a transferred sheet to form images on the both sides of the sheet.

Next, full-color image formation (color copying) using the tandem developing unit 120 will be described. At first, a source document is placed on a document tray 130 of the automatic document feeder 400. Alternatively, the automatic document feeder 400 is opened, the source document is placed on a contact glass 32 of a scanner 300, and the automatic document feeder 400 is closed.

When a start switch (not shown) is pushed, the source document placed on the automatic document feeder 400 is transferred onto the contact glass 32, and the scanner is then driven to operate first and second carriages 33 and 34. In a case where the source document is originally placed on the contact glass 32, the scanner 300 is immediately driven after pushing of the start switch. Light is applied from a light source to the document by means of the first carriage 33, and light reflected from the document is further reflected by the mirror of the second carriage 34. The reflected light passes through an image-forming lens 35, and a read sensor 36 receives it. In this way the color document (color image) is scanned, producing 4 types of color information—black, yellow, magenta, and cyan.

Figure 13:
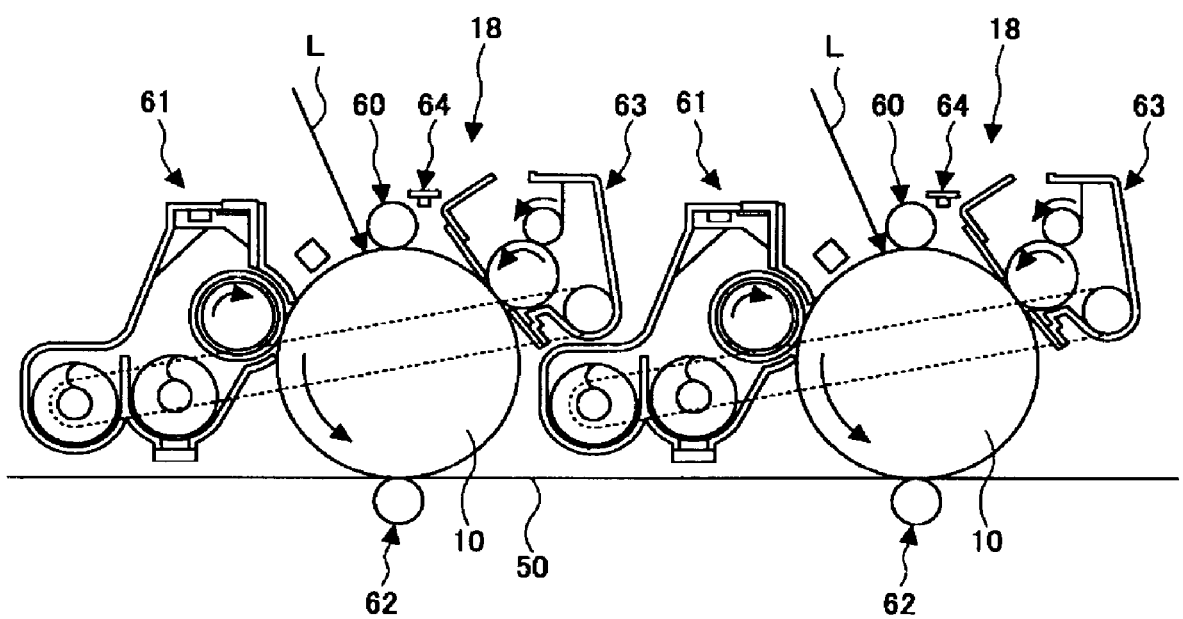
FIG. 13 is a partially enlarged diagram of the image forming apparatus shown in FIG. 12.

Each piece of color information (black, yellow, magenta, and cyan) is transmitted to the image forming unit 18 (black image forming unit, yellow image forming unit, magenta image forming unit, or cyan image forming unit) of the tandem developing unit 120, and toner images of each color are formed in the image-forming units 18. As shown in FIG. 13, each of the image-forming units 18 (black image-forming unit, yellow image forming unit, magenta image forming unit, and cyan image forming unit) of the tandem developing unit 120 comprises: a latent electrostatic image bearing member 10 (latent electrostatic image bearing member for black 10K, latent electrostatic image bearing member for yellow 10Y, latent electrostatic image bearing member for magenta 10M, or latent electrostatic image bearing member for cyan 10C); a charging device 60 for uniformly charging the latent electrostatic image bearing member; an exposing unit for forming a latent electrostatic image corresponding to the color image on the latent electrostatic image bearing member by exposing it to light (denoted by "L" in FIG. 13) on the basis of the corresponding color image information; a developing device 61 for developing the latent electrostatic image using the corresponding color toner (black toner, yellow toner, magenta toner, or cyan toner) to form a toner image; a transfer charger 62 for transferring the toner image to the intermediate transferring member 50; a cleaning device 63; and a charge removing device 64. Thus, images of different colors (a black image, a yellow image, a magenta image, and a cyan image) can be formed based on the color image information. The black toner image formed on the photoconductor for black 10K, yellow toner image formed on the photoconductor for yellow 10Y, magenta toner image formed on the photoconductor for magenta 10M, and cyan toner image formed on the photoconductor for cyan 10C are sequentially transferred onto the intermediate transferring member 50 which rotates by means of support rollers 14, 15 and 16 (primary transferring). These toner images are overlaid on the intermediate transferring member 50 to form a composite color image (color transferred image).

Meanwhile, one of feed rollers 142 of the feed table 200 is selected and rotated, whereby sheets (recording sheets) are ejected from one of multiple feed cassettes 144 in the paper bank 143 and are separated one by one by a separation roller 145. Thereafter, the sheets are fed to a feed path 146, transferred by a transfer roller 147 into a feed path 148 inside the copying machine main body 150, and are bumped against a resist roller 49 to stop. Alternatively, one of the feed rollers 142 is rotated to eject sheets (recording sheets) placed on a manual feed tray. The sheets are then separated one by one by means of a separation roller 52, fed into a manual feed path 53, and similarly, bumped against the resist roller 49 to stop. Note that the resist roller 49 is generally earthed, but it may be biased for removing paper dusts on the sheets.

The resist roller 49 is rotated synchronously with the movement of the composite color image on the intermediate transferring member 50 to transfer the sheet (recording sheet) into between the intermediate transferring member 50 and the secondary transferring unit 22, and the composite color image is transferred onto the sheet by means of the secondary transferring unit 22 (secondary transferring). In this way the color image is formed on the sheet. Note that after image transferring, toner particles remained on the intermediate transferring member 50 are cleaned by means of the cleaning device 17.

The sheet (recording sheet) bearing the transferred color image is conveyed by the secondary transferring unit 22 into the image fixing device 25, where the composite color image (color transferred image) is fixed to the sheet (recording sheet) by heat and pressure. Thereafter, the sheet changes its direction by action of a switch hook 55, ejected by an ejecting roller 56, and stacked on an output tray 57. Alternatively, the sheet changes its direction by action of the switch hook 55, flipped over by means of the sheet reverser 28, and transferred back to the image transfer section for recording of another image on the other side. The sheet that bears images on both sides is then ejected by means of the ejecting roller 56, and is stacked on the output tray 57.

EXAMPLES

The following explains examples of the present invention; however, it should be noted that the present invention is not confined to these examples in any way. In the examples, "part" and "parts" denote "part by weight" and "parts by weight", respectively.

The following ingredients were mixed to prepare a mixture, the mixture was then melted and kneaded by means of an extruder, and the thus obtained molten material was supplied to a mouth ring at 200° C. The molten material was processed by making the molten material collide with an air flow just after ejecting the molten material from the mouth ring. The formed resinous particles as a result of this process were collected by means of a cyclone and a dust collector.

(Ingredients)

95.00 parts of polyester resin (T1/2: 124° C., Tg: 58° C.)

6.00 parts of magenta pigment (TOSHIKI RED 1022, manufactured by Dainippon Ink and Chemicals, Inc.)

5.00 parts of carnauba wax (melting point: 80° C.)

0.50 parts of polarity controlling agent (BONTRON E-304, manufactured by Orient Chemical Industries, Ltd.)

Examples 1-3, Comparative Examples 1-5

The resinous particles were produced by means of an apparatus illustrated in FIG. 1A. The specific details for the production are explained hereinafter. In FIG. 1A, 1 denotes a mouth ring, 2 denotes a chamber, each of 3 and 4 denotes a heating unit, 5 denotes an extruder, 6 denotes a cyclone, 7 denotes a dust collector, 8 denotes an air intake blower, and 9 denotes a direction in which a mixture of the ingredients is supplied.

The mouth ring 1 (see FIG. 2) was a circular nozzle having a diameter of 1 mm, and was integrally constructed with a concentrically constructed nozzle of high pressure air flow A1. The high pressure air flow A1 was formed in such manner that an air introduced from an air inlet 11 was passed through an air flow pass 12 and reached to a circulated flow forming section 13, and the formed high pressure air flow A1 was released from an air outlet 14. The circulated air flow had a circulated vector of anti-clockwise. The melted mixture was, after introducing from a melted mixture inlet 15, passed through a melted mixture pass 17 in the shape of an inner ring which was separated from the air pass 12 with a side wall 16, and released from a melted mixture outlet 18.

The mouth ring 1 was disposed towards the inside of the chamber 2 which functioned as a side wall for controlling the temperature of the atmosphere where the resinous particles were formed as well as a collector for the formed resinous particles, and the mouth ring 1 introduced the melted mixture into the chamber 2. The nozzle of the high pressure air flow A1 was also disposed towards the inside of the chamber 2.

The chamber 2 was consisted of a cylindrical part where the resinous particles were formed, and a corn part which was configured to send the formed resinous particles to a pipe. The inner pressure of the chamber 2 was controlled at about −1.2 kPa by controlling the air suction amount from the pipe by means of the air intake blower 8.

Figure 3:
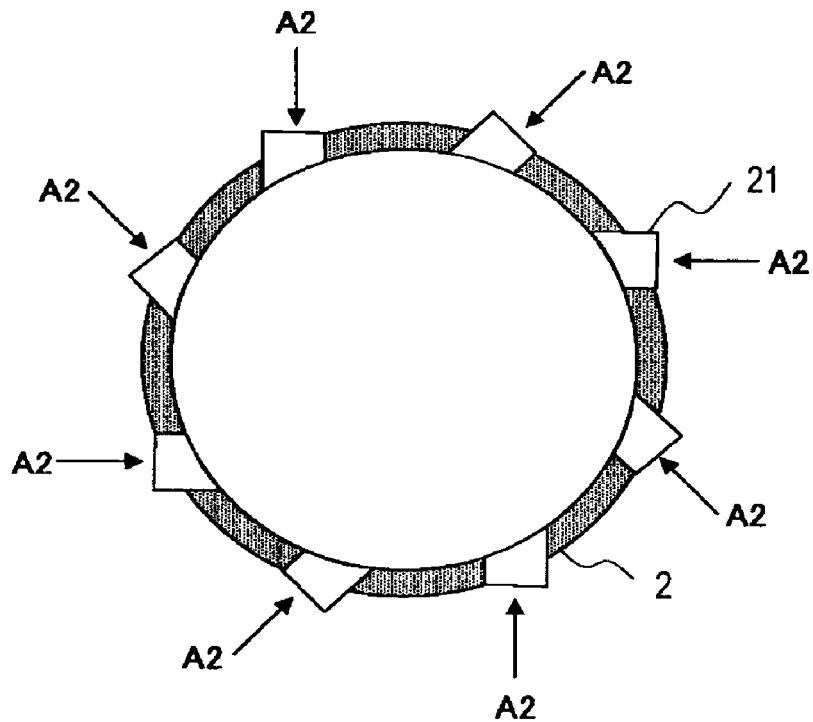
FIG. 3 is a schematic diagram showing a louver shaped air inlet for an air flow A2.
Figure 4:
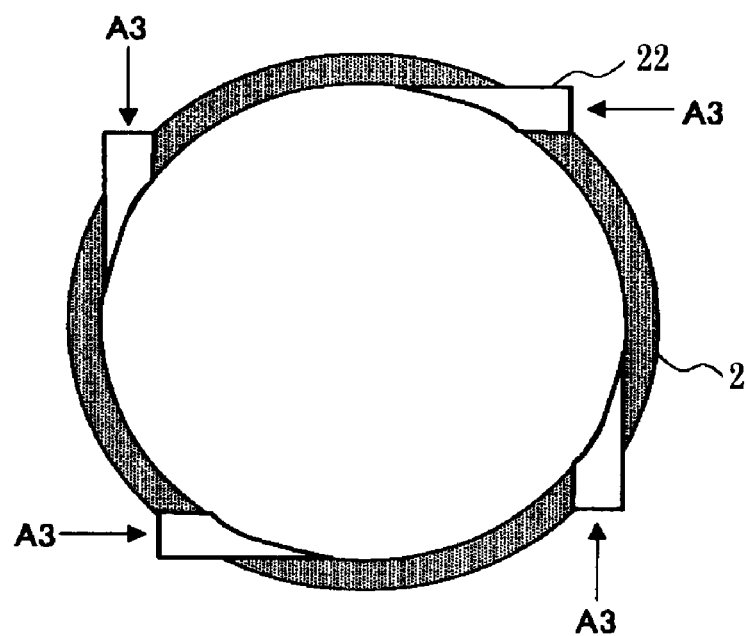
FIG. 4 is a schematic diagram showing a slit shaped air inlet for air flow A3.

In addition, the chamber 2 was equipped with systems taking an air flow A2 and an air flow A3 therein, apart from the high pressure air flow A1. The air flow A2 was introduced from a louver shaped air inlet 21 (see FIG. 3) disposed adjacent to the nozzle of the high pressure air flow A1 and on the top board of the chamber, while having a circulated vector of anti-clockwise. The air flow A3 was introduced from a slit shaped air inlet 22 (see FIG. 4) disposed on the side surface of the cylindrical part, while having a circulated vector of anti-clockwise.

Figure 1B:
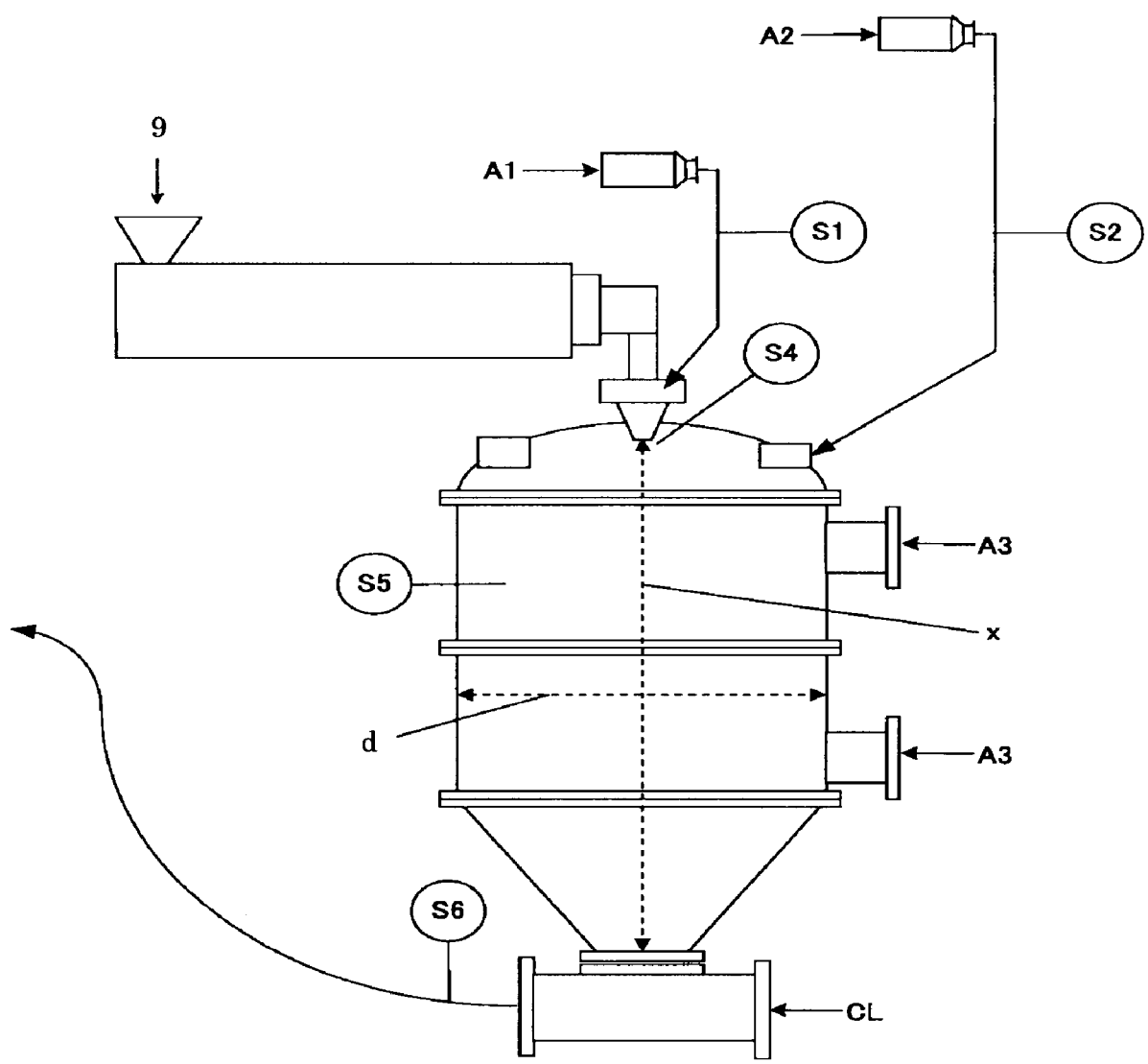
FIG. 1B is a partially enlarged diagram of the apparatus for producing resinous particles shown in FIG. 1A.

As shown in FIG. 1B, TA1 and TA2 denoted respectively temperatures A1-A3 measured by thermal sensors S1 and S2. TA1 and TA2 were controlled by the heating unit. Moreover, TA4 denoted a temperature of a resinous particle forming section measured by a thermal sensor S4, and TA5 denoted a temperature of thermal insulation atmosphere after forming the resinous particles, measured by a thermal sensor S5. TA5 could be controlled by adjusting the temperatures A1-A3, and the supply amount. TA6 denotes a temperature of exhaust air measured by a thermal sensor S6, and TA6 was controlled to be at lower than 58° C. by introducing a cooled air flow CL into the bottom of the chamber, i.e. into the down stream.

As the air flow A3 and the cooled air flow CL, the air having the temperature of 20° C. was used.

Since TA4 had been confirmed to be approximately 85% of TA1 as a result of calibration, TA4 was not directly measured in the process of producing resinous particles, and TA4 was calculated from TA1.

The particle diameter of the resinous particles was controlled by adjusting the supply pressure of the high pressure air flow A1 within a range of 0.1 MPa to 1.0 MPa so as to adjust the ejection speed of the high pressure air flow A1. Specifically, the particle diameter of the resinous particles becomes small if the supply pressure is increased, and the particle diameter of the resinous particles becomes large if the supply pressure is decreased. Note that, in Examples 1-3 and Comparative Examples 1-5, it was controlled so that the resinous particles had a volume average particle diameter of 5.6 µm in accordance with a coulter counter method. Here, a ratio of the volume average particle diameter of the resinous particles to a number average particle diameter thereof was 1.1 to 1.3.

The place and the time duration t that the resinous particles were kept in an atmosphere having the temperature of from Tg of the binder resin to 1.5 times of T1/2 of the binder resin were substantially the inside of the chamber, and approximately the retention time in the chamber, respectively. According to this determination, the traveling volume V of the air flow including the resinous particles per hour is a sum of the high pressure air flow A1, the air flow A2 and the air flow A3. Moreover, the duration time t can be calculated from the cross-section area of the chamber calculated from the traveling distance x (see FIG. 1B) and the diameter d of the cylindrical part (see FIG. 1B).

In Examples 1-3 and Comparative Examples 1-5, TA1, TA2, TA4, TA5 and t were changed as shown in Table 1.

TABLE 1

| | TA1 [° C.] | TA2 [° C.] | TA4 [° C.] | TA5 [° C.] | t [sec] |
|---|---|---|---|---|---|
| Com. Ex. 1 | 65 | 65 | 55 | 48 | [3.4] |
| Com. Ex. 2 | 150 | 130 | 128 | 55 | [3.1] |
| Com. Ex. 3 | 420 | 315 | 375 | 130 | 2.4 |
| Com. Ex. 4 | 350 | 315 | 298 | 130 | 0.8 |
| Com. Ex. 5 | 350 | 315 | 298 | 130 | 18.0 |
| Ex. 1 | 150 | 130 | 128 | 65 | 3.6 |
| Ex. 2 | 350 | 315 | 298 | 130 | 3.3 |
| Ex. 3 | 370 | 350 | 315 | 180 | 2.7 |

Note that, in Comparative Examples 1 and 2, TA5 was outside the range of from Tg of the binder resin to 1.5 times of T1/2 of the binder resin, but the time t was shown as if TA5 was within this temperature range, for comparison.

The evaluation results of the wax deposition amount on the surface were shown in Table 2.

TABLE 2

| | TW | TW' | Wax deposition on the surface [wt %] |
|---|---|---|---|
| Com. Ex. 1 | 0.987 | 0.791 | 24.8 |
| Com. Ex. 2 | 0.993 | 0.883 | 12.5 |
| Com. Ex. 3 | 0.913 | 0.87 | 4.9 |
| Com. Ex. 4 | 0.967 | 0.807 | 19.8 |
| Com. Ex. 5 | 0.95 | 0.765 | 24.2 |
| Ex. 1 | 0.994 | 0.966 | 2.9 |
| Ex. 2 | 0.971 | 0.955 | 1.7 |
| Ex. 3 | 0.969 | 0.95 | 2.0 |

Examples 4-6, Comparative Examples 6-10

Figure 5A:
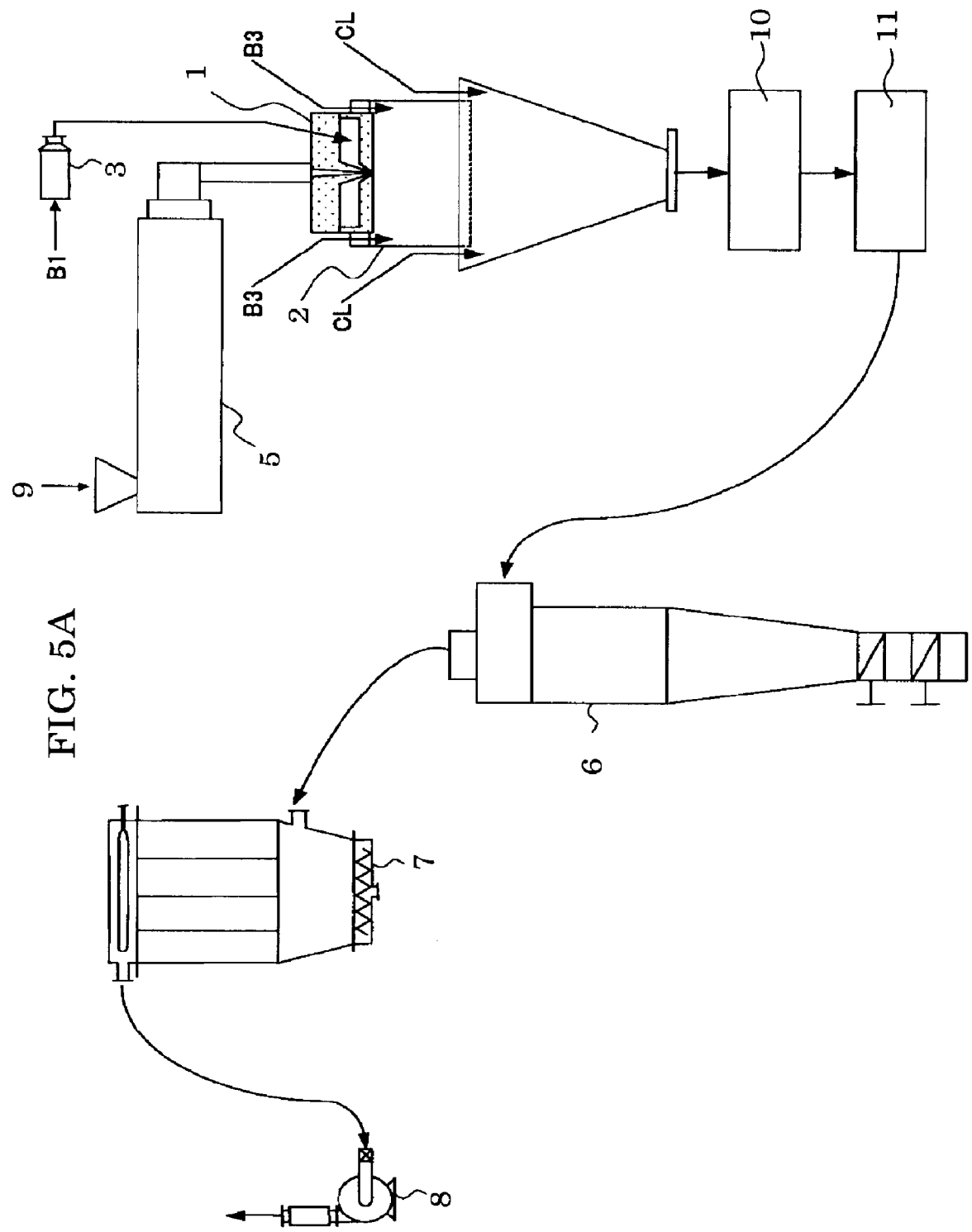
FIG. 5A is a schematic diagram showing a second example of an apparatus for producing resinous particle for use in the present invention.

The fibrous precursor was produced by means of an apparatus illustrated in FIG. 5A. The specific details for the production are explained hereinafter. In FIG. 5A, 1 denotes a mouth ring, 2 denotes a chamber, 3 denotes a heating unit, 5 denotes an extruder, 6 denotes a cyclone, 7 denotes a dust collector, 8 denotes an air intake blower, 9 denotes a direction in which a mixture of the ingredients is supplied, 10 denotes a cutter mill, and 11 denotes a pulverizer equipped in a classifier.

Figure 6:
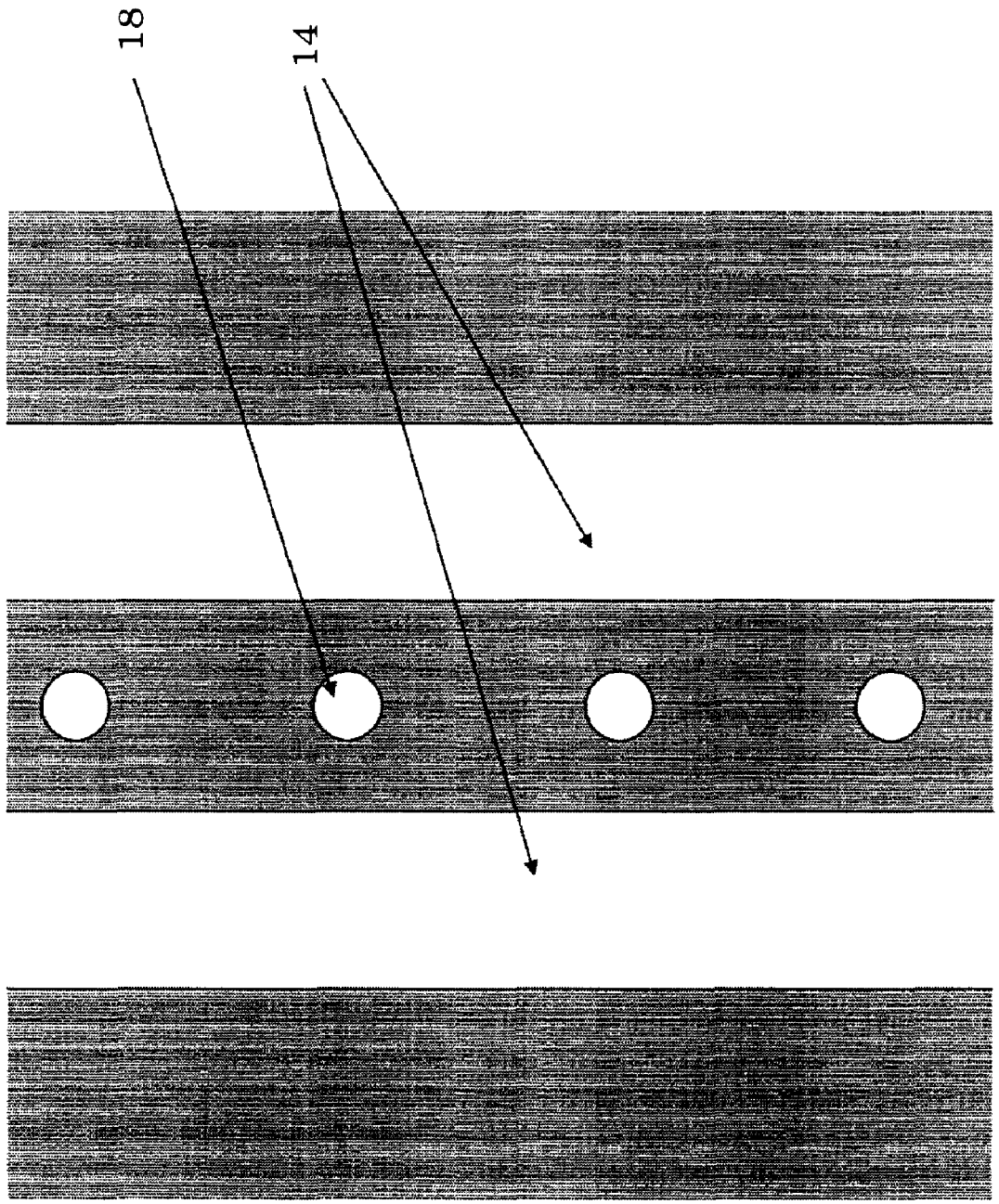
FIG. 6 is a schematic diagram showing a mouth ring (outlet side).

The mouth ring 1 (see FIG. 6) had as a melted mixture outlet 18, a plural of circular nozzle having a diameter of 190 µm arranged in one raw, and a slit shaped air outlet 14 of the high pressure air flow B1 was integrally constructed, and horizontally arranged with respect to the raw of the circular nozzles.

The mouth ring 1 was disposed towards the inside of the chamber 2 which functioned as a side wall for controlling the temperature of the atmosphere where the resinous particles were formed as well as a collector for the formed resinous particles, and the mouth ring 1 introduced the melted mixture into the chamber 2. The outlet of the high pressure air flow B1 was also disposed towards the inside of the chamber 2.

The chamber 2 was consisted of a square tube part where the precursor was formed, and a square angular part which was configured to send the formed precursor to a pipe. The inner pressure of the chamber 2 was controlled at about −1.0 kPa by controlling the air suction amount from the pipe by means of the air intake blower 8.

In addition, the chamber 2 was equipped with a system taking an air flow B3 therein, apart from the high pressure air flow B1. The air flow B3 was introduced in the chamber along the inner side of the square tuber part from a slit disposed along the circumference on the top board of the chamber.

Figure 5B:
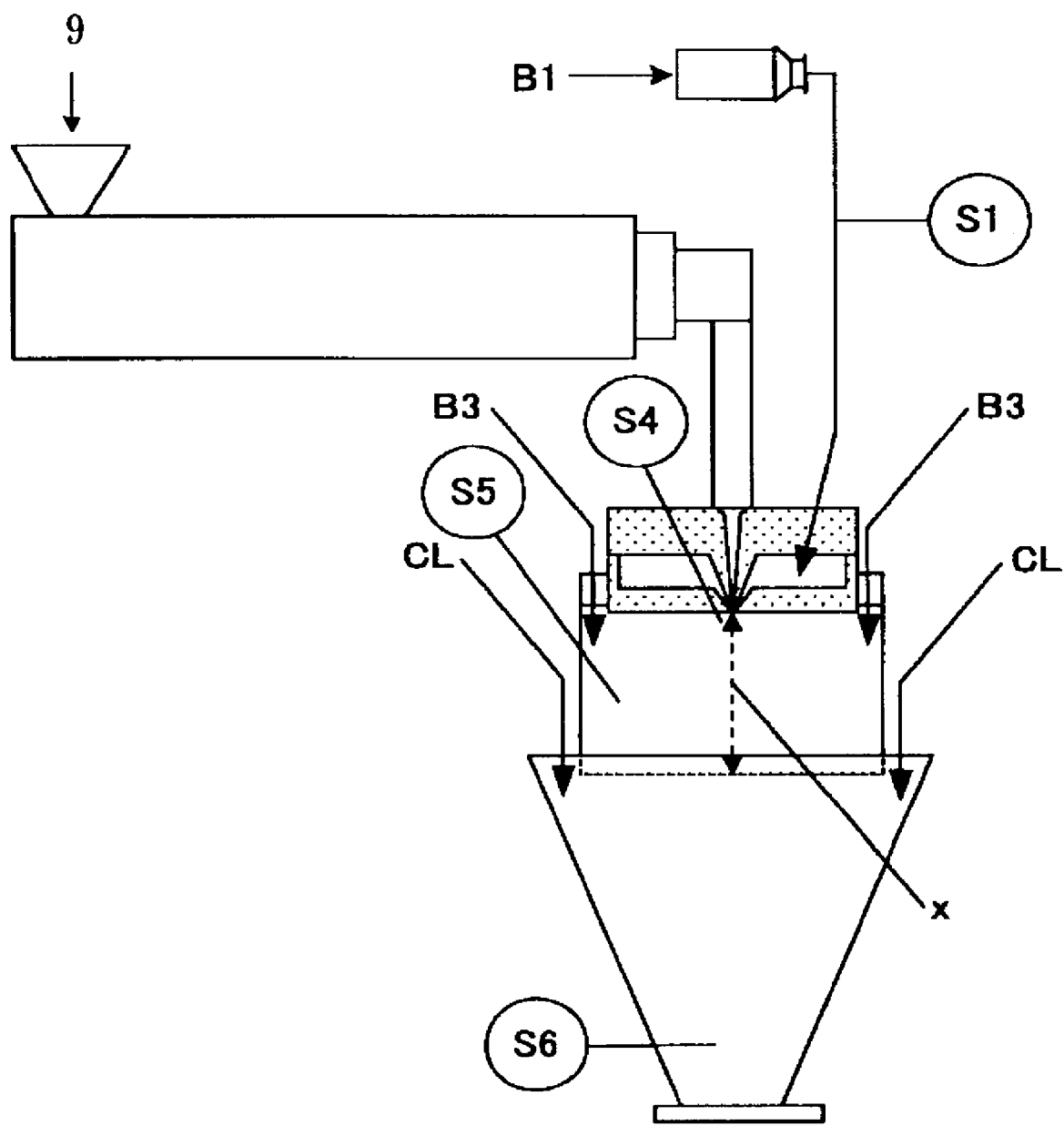
FIG. 5B is a partially enlarged diagram showing the apparatus for producing resinous particles shown in FIG. 5A.

As shown in FIG. 5B, TB1 denoted a temperature B1 measured by a thermal sensor S1. TB1 was controlled by the heating unit. Moreover, TB4 denoted a temperature of a precursor forming section measured by a thermal sensor S4, and TB5 denoted a temperature of thermal insulation atmosphere after forming the precursor, measured by a thermal sensor S5. TB5 could be controlled by adjusting the temperatures B1 and B3, and the supply amount. TB6 denoted a temperature of exhaust air measured by a thermal sensor S6, and TB6 was controlled to be at lower than 58° C. by introducing a cooled air flow CL from a slit shaped air inlet disposed along the circumference on the top surface of the square angular part of the chamber.

As the air flow B3 and the cooled air flow CL, the air having the temperature of 20° C. was used.

Since TB4 had been confirmed to be approximately 90% of TB1 as a result of calibration, TB4 was not directly measured in the process of producing resinous particles, and TB4 was calculated from TB1.

The diameter of the precursor (the diameter of the fiber) was controlled by adjusting the supply pressure of the high pressure air flow B1 within a range of 0.1 MPa to 0.3 MPa so as to adjust the ejection speed of the high pressure air flow B1. Specifically, the diameter of the fiber becomes small if the supply pressure is increased, and the diameter of the fiber becomes large if the supply pressure is decreased. In Examples 4-6 and Comparative Examples 6-10, the supply pressure of the high pressure air flow B1 was controlled so that the precursor was continuously formed and the arbitrarily selected 300 pieces of the fibers had a diameter of 5.0 μm.

Furthermore, the thus obtained precursor was pulverized by means of the cutter mill 10, and the pulverizer 11 equipped in the classifier to thereby yield resinous particles. In Examples 4-6 and Comparative Examples 6-10, the resinous particles had a volume average particle diameter of 5.3 μm to 5.9 μm, and a ratio of the volume average particle diameter to a number average particle diameter to be 1.1 to 1.3.

Since the precursor was continually formed in the place that the precursor kept in an atmosphere having the temperature of from Tg of the binder resin to 1.5 times of T1/2 of the binder resin, the traveling distance x (see FIG. 5B) in the heat insulation atmosphere was determined as a distance from the mouth ring to the square angular part. The speed of the streamline of the precursor was set as a value which calculated from the outlet amount and the diameter of the fiber. The duration time t that the precursor was kept in an atmosphere having the temperature of from Tg of the binder resin to 1.5 times of T1/2 of the binder resin was determined using these values.

In Examples 4-6 and Comparative Examples 6-10, TB1, TB4, TB5 and t were changed as shown in Table 3.

TABLE 3

| | TB1 [° C.] | TB4 [° C.] | TB5 [° C.] | t [m · sec] |
|---|---|---|---|---|
| Com. Ex. 6 | 60 | 54 | 48 | [3.2] |
| Com. Ex. 7 | 150 | 135 | 55 | [3.1] |
| Com. Ex. 8 | 420 | 378 | 130 | 2.5 |
| Com. Ex. 9 | 350 | 315 | 126 | 0.8 |
| Com. Ex. 10 | 350 | 315 | 126 | 12.0 |
| Ex. 4 | 150 | 135 | 64 | 3.5 |
| Ex. 5 | 350 | 315 | 126 | 3.2 |
| Ex. 6 | 370 | 333 | 180 | 3.8 |

Note that, in Comparative Examples 5 and 6, TB5 was outside the range of from Tg of the binder resin to 1.5 times of T1/2 of the binder resin, but t was shown as if TB5 was within this temperature range, for comparison.

The evaluation results of the wax deposition amount on the surface were shown in Table 4.

TABLE 4

| | TW | TW' | Wax deposition on the surface [wt %] |
|---|---|---|---|
| Com. Ex. 6 | 0.991 | 0.789 | 25.6 |
| Com. Ex. 7 | 0.997 | 0.875 | 13.9 |
| Com. Ex. 8 | 0.933 | 0.872 | 7.0 |
| Com. Ex. 9 | 0.979 | 0.795 | 23.1 |
| Com. Ex. 10 | 0.971 | 0.757 | 28.3 |
| Ex. 4 | 0.996 | 0.959 | 3.9 |
| Ex. 5 | 0.980 | 0.949 | 3.3 |
| Ex. 6 | 0.983 | 0.947 | 3.8 |

Examples 7 and 8

Figure 7A:
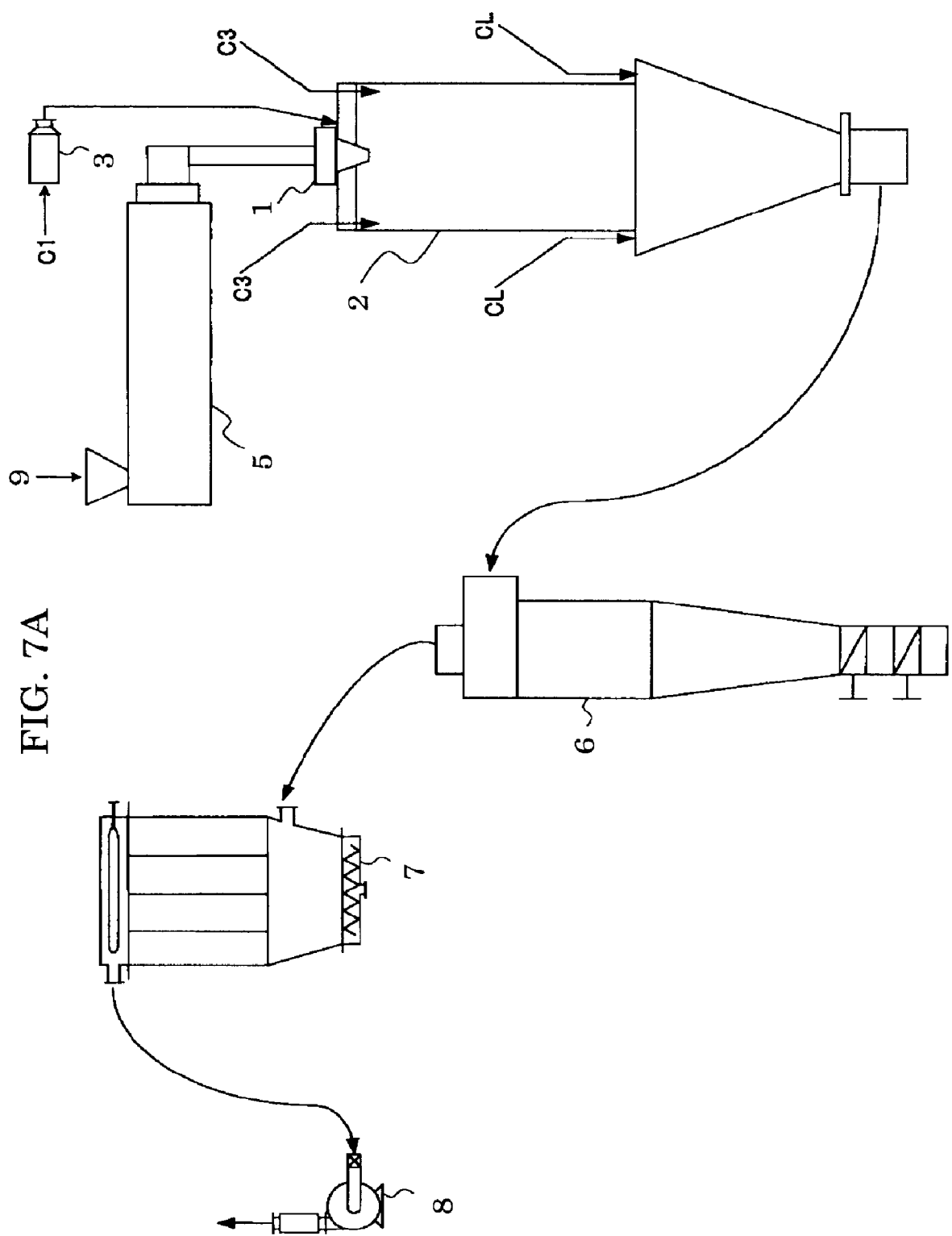
FIG. 7A is a schematic diagram showing a third example of an apparatus for producing resinous particles for use in the present invention.

The resinous particles were produced by means of an apparatus illustrated in FIG. 7A. The specific details for the production are explained hereinafter. In FIG. 7A, 1 denotes a mouth ring, 2 denotes a chamber, 3 denotes a heating unit, 5 denotes an extruder, 6 denotes a cyclone, 7 denotes a dust collector, 8 denotes an air intake blower, and 9 denotes a direction in which a mixture of the ingredients is supplied.

Figure 2:
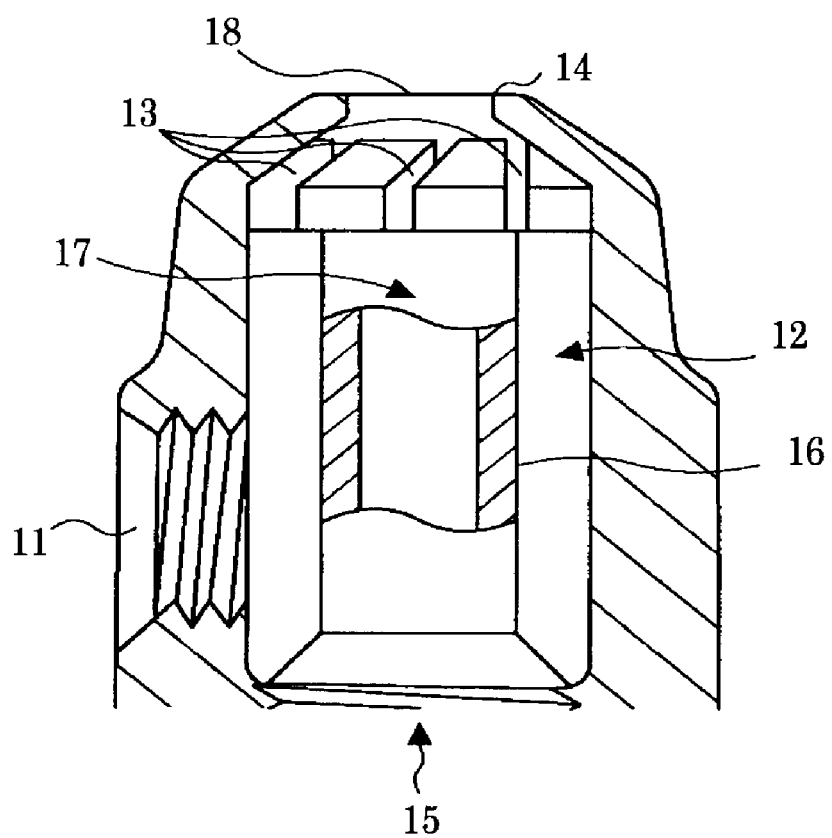
FIG. 2 is a schematic diagram showing a mouth ring.

The mouth ring 1 for use here was the one shown in FIG. 2 as in Example 1. The mouth ring 1 was disposed towards the inside of the chamber 2 which functioned as a side wall for controlling the temperature of the atmosphere where the resinous particles were formed as well as a collector for the formed resinous particles, and the mouth ring 1 introduced the melted mixture into the chamber 2. The nozzle of the high pressure air flow C1 was also disposed towards the inside of the chamber 2.

The chamber 2 was consisted of a cylindrical part where the resinous particles were formed, and a corn part where the formed resinous particles were sent to a pipe while being cooled. The inner pressure of the chamber 2 was controlled at about −0.5 kPa by controlling the air suction amount from the pipe by means of the air intake blower 8.

In addition, the chamber 2 was equipped with a system taking an air flow C3 therein, apart from the high pressure air flow C1. The air flow C3 was introduced in the chamber along the inner side of the square tuber part from a slit disposed along the circumference on the top board of the chamber.

Figure 7B:
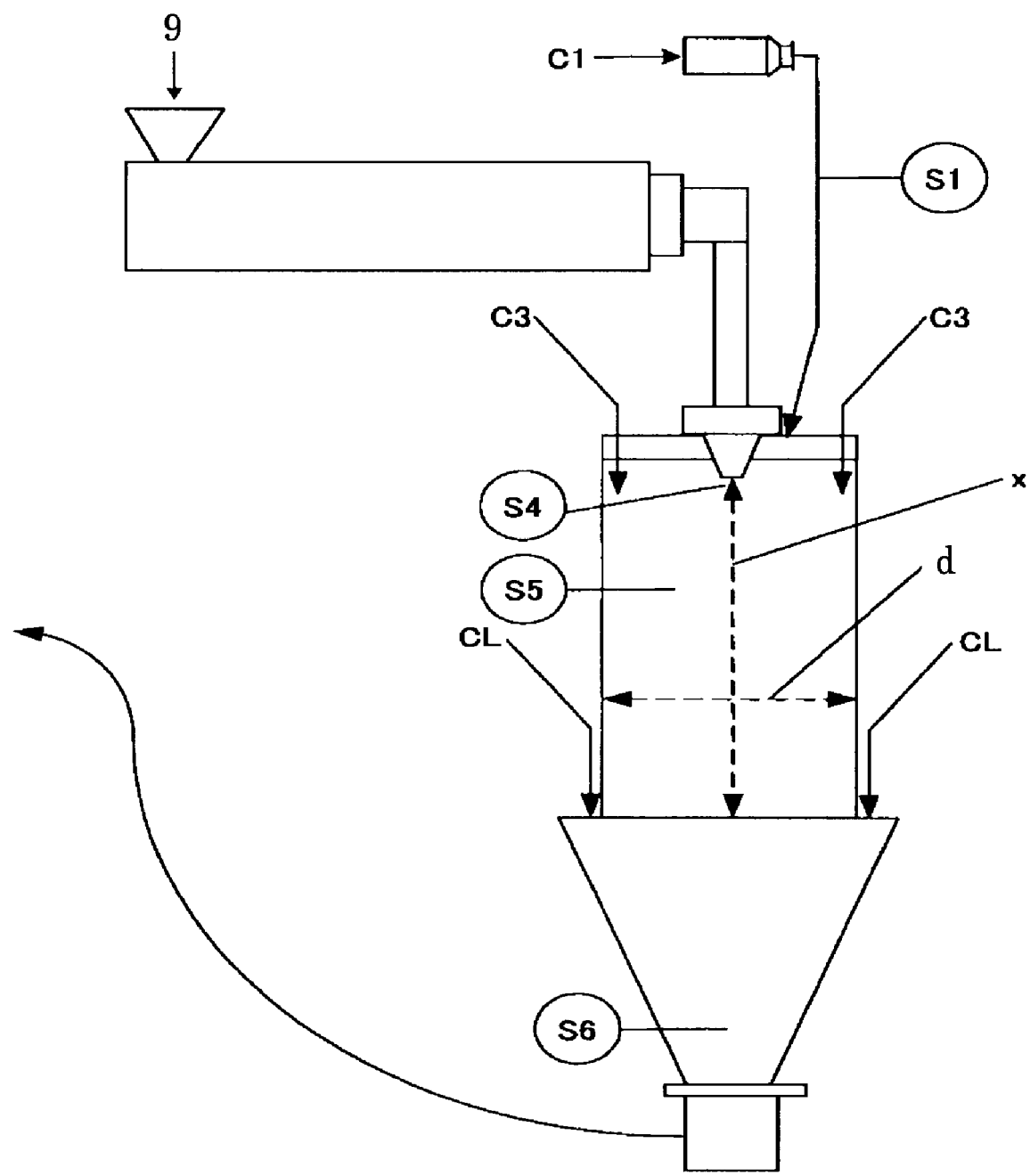
FIG. 7B is a partially enlarged diagram showing the apparatus for producing resinous particles shown in FIG. 7A.

As shown in FIG. 7B, TC1 denoted a temperature of C1 measured by a thermal sensor S1. TC1 was controlled by the heating unit. Moreover, TC4 denoted a temperature of a resinous particle forming section measured by a thermal sensor S4, and TC5 denoted a temperature of thermal insulation atmosphere after forming the precursor, measured by a thermal sensor S5. TC5 could be controlled by adjusting the temperatures of C1 and C3, and the supply amount. TC6 denoted a temperature of exhaust air measured by a thermal sensor S6, and TC6 was controlled to be at lower than 58° C. by introducing a cooled air flow CL from a slit shaped air inlet disposed along the circumference on the top surface of the cylindrical part of the chamber.

As the air flow C3 and the cooled air flow CL, the air having the temperature of 20° C. was used.

Since TC4 had been confirmed to be approximately 78% of TC1 as a result of calibration, TC4 was not directly measured in the process of producing resinous particles, and TC4 was calculated from TC1.

The particle diameter of the resinous particles was controlled by adjusting the supply pressure of the high pressure air flow C1 within a range of 0.1 MPa to 1.0 MPa so as to adjust the ejection speed of the high pressure air flow C1. Specifically, the diameter of the fiber becomes small if the supply pressure is increased, and the diameter of the fiber becomes large if the supply pressure is decreased.

In Examples 7 and 8, the supply pressure of the high pressure air flow C1 was controlled so that the resinous particles had a volume average diameter of 5.6 μm in accordance with a coulter counter method. Here, a ratio of the volume average particle diameter of the resinous particles to a number average particle diameter thereof was 1.1 to 1.3.

The place and the time duration t that the resinous particles were kept in an atmosphere having the temperature of from Tg of the binder resin to 1.5 times of T1/2 of the binder resin were substantially the inside of the chamber, and approximately the retention time in the chamber, respectively. According to this determination, the traveling volume V of the air flow including the resinous particles per hour is a sum of the high pressure air flow C1 and the air flow C3. Moreover, the duration time t can be calculated from the cross-section area of the chamber calculated from the traveling distance x (see FIG. 7B) and the diameter d of the cylindrical part (see FIG. 7B).

In Examples 7 and 8, TC1, TC4, TC5 and t were changed as shown in Table 5.

TABLE 5

|  | TC1 [° C.] | TC4 [° C.] | TC5 [° C.] | t [sec] |
| --- | --- | --- | --- | --- |
| Ex. 7 | 370 | 326 | 130 | 3.3 |
| Ex. 8 | 300 | 234 | 110 | 2.1 |

The evaluation results of the wax deposition amount on the surface were shown in Table 6.

TABLE 6

|  | TW | TW' | Wax deposition on the surface [wt %] |
| --- | --- | --- | --- |
| Ex. 7 | 0.963 | 0.95 | 1.4 |
| Ex. 8 | 0.992 | 0.963 | 3.0 |

[Mixing of External Additives]

100 parts of the resinous particles, 0.75 parts of silica particles having a specific area diameter of 20 nm, and 0.75 parts of silica particles having a specific area diameter of 50 μm were mixed by means of HENSCHEL MIXER to thereby yield a toner.

[Production of a Developer]

2.5 parts of the toner and 97.5 parts of ferrite carrier (average particle diameter of the core: 45 μm) coated with a silicone resin were stirred by means of a turbulent mixer to thereby produce a developer.

[Methods and Results of Evaluation]

The thus obtained developer was evaluated in the following manners.

(a) Filming 20,000 pieces of a printing test were conducted by using a color printer (IPSiO Color 4100 manufactured by Ricoh Company Ltd.) and a transfer paper (Type 6200 manufactured by Ricoh Company Ltd.). The resulted prints were observed in view of that whether there were any defectives in the image due to filming, and the surface of the photoconductor was also observed, and then the results were evaluated based on the following criteria.

[Evaluation Criteria]

A: The conditions of the initial print were maintained throughout the test, and especially excellent.
B: The conditions of the initial print were substantially maintained.
C: There was no problem in the image, but the slight filming was observed on the surface of the photoconductor.
D: The significant filming was observed on the surface of the photoconductor, and the defective image was formed.

(b) Adhesion to a Blade 20,000 pieces of a printing test were conducted by using a color printer (IPSiO Color 4100 manufactured by Ricoh Company Ltd.) and a transfer paper (Type 6200 manufactured by Ricoh Company Ltd.). The resulted prints were observed in view that whether there were any defectives in the image, e.g. white lines in the image, due to the adhesion to the blade, and the blade was also observed, and then the results were evaluated based on the following criteria.

[Evaluation Criteria]

A: The conditions of the initial print were maintained throughout the test, and especially excellent.
B: The conditions of the initial print were substantially maintained.
C: There was no problem in the image, but the slight adhesion was observed on the blade.
D: The significant adhesion was observed on the blade, and the defective image, e.g. white lines in the image, was formed.

(c) Image Density

The images were formed at the four corners and the center part on 20,000 pieces of the transfer paper (Type 6200 manufactured by Ricoh Company Ltd.) by means of a tandem type color electrophotographic apparatus (imagio Neo 450 manufactured by Ricoh Company Ltd.) which had been modified in the belt fixing system, so as that the toner deposition amount to be 1.00±0.1 mg/cm$^2$. Note that, each image had 0.1% area (in the shape of square) of the paper, and the surface temperature of the fixing roller was set at 160±2° C. The image density of the image obtained after 20,000$^{th}$ prints was measured at five spots by means of a spectrometer (938 Spectrodensitometer, manufactured by X-Rite). The average of the image densities measured at the five spots was taken for the evaluation, and the evaluation was carried out based on the following criteria. Note that, the higher value means the higher image density and capability of the image formation of high density, and if the image density is 1.2 or more, it is sufficient for practical use.

[Evaluation Criteria]
A: The image density was 1.4 or more.
B: The image density was 1.2 or more, but less than 1.4.
C: The image density was 1.0 or more, but less than 1.2.
D: The image density was less than 1.0.

(d) Fogging

The endurance test was conducted by continuously inputting a chart having the image area ratio of 5% at the temperature of 10° C., and the relative humidity of 15%, by means of a color electrophotographic apparatus (IPSiO Color 8100 manufactured by Ricoh Company Ltd.) which had been modified in the oil-free fixing system, and had been tuned. The degree of the toner smear in the background of the transfer paper was observed with naked eyes (magnifying lens), and the results were evaluated by the following criteria.

[Evaluation Criteria]
A: There was no toner smear, and the excellent condition.
B: The slight toner smear was observed, but the degree of the smear was within the acceptable level.
C: The toner smear was observed a little.
D: The toner smear was significant, and the degree thereof was outside the acceptable level.

(e) Low Temperature Fixing Properties

The photocopying test was conducted by means of a photocopier (MF2200 manufactured by Ricoh Company Ltd.) wherein the fixing unit thereof had been modified by using a TEFRON roller as the fixing roller, and transfer paper (Type 6200 manufactured by Ricoh Company Ltd.), and the minimum fixing temperature was measured by changing the temperature of the fixing roller. Specifically, the minimum fixing temperature was measured by setting the linear velocity of paper feeding at 120-150 mm/sec, bearing at 1.2 kgf/cm$^2$, and a nip width at 3 mm. The results were evaluated based on the criteria presented below. Note that, the minimum fixing temperature for the conventional low temperature fixing toner is 140-150° C., and the lower the minimum fixing temperature means excellent low temperature fixing properties.

[Evaluation Criteria]
A: The minimum fixing temperature was less than 120° C.
B: The minimum fixing temperature was more than 120° C., but less than 130° C.
C: The minimum fixing temperature was more than 130° C., but less than 140° C.
D: The minimum fixing temperature was more than 140° C.

TABLE 7

| | Filming | Adhesion to blade | Image density | Fogging | Low temperature fixing properties |
|---|---|---|---|---|---|
| Com. Ex. 1 | C | C | B | C | A |
| Com. Ex. 2 | B | B | A | B | B |
| Com. Ex. 3 | B | B | A | B | C |
| Com. Ex. 4 | B | C | A | B | A |
| Com. Ex. 5 | C | C | B | C | A |
| Com. Ex. 6 | C | C | B | C | A |
| Com. Ex. 7 | C | B | A | B | B |
| Com. Ex. 8 | B | B | A | B | C |
| Com. Ex. 9 | C | C | B | C | A |
| Com. Ex. 10 | C | C | B | C | A |
| Ex. 1 | A | A | B | A | A |
| Ex. 2 | A | A | B | A | B |
| Ex. 3 | A | A | B | A | B |
| Ex. 4 | A | A | A | A | A |
| Ex. 5 | A | A | A | A | A |
| Ex. 6 | A | A | A | A | A |
| Ex. 7 | A | B | B | A | B |
| Ex. 8 | A | A | A | A | A |

With regard to the evaluations above, the practicability of the evaluation criteria was as follows.
A: Excellent.
B: The practicability is more than sufficient, and no problem in the commercial scene.
C: A problem may be caused, but rarely, in the commercial scene depending on the operating environment.
D: There may cause a problem in the commercial scene.

[Discussion]

From Tables 2, 4, 6, it was found that the surface wax amounts of the toners of the examples were controlled to be less than 4.2% by weight, and the excellent encapsulating conditions were formed. Moreover, from the results of Examples 1-3, 7 and 8, it was conformed that the same effect could be reproduced even when the embodiments of the production device of the resinous particles were different. Furthermore, from the results of Examples 4-6, it was found that the same effects could be attained when the resinous particles were formed via the precursor.

With regard to Comparative Examples 1-3 and 6-8, it was considered that the encapsulation of the wax was not progressed as the temperature conditions were not preferable. It is assumed that the encapsulation was not progressed in Comparative Example 4 and 9, as t was too short. On the other hand, it is assumed that the encapsulated grains of the wax became excessively large as t was too long, and some of the grains of the wax were exposed on the surface of the resinous particles in Comparative Examples 5 and 10.

According to the results shown in Table 7, it was found that the toners of Examples tended no to cause filming or adhesion to the blade, and excelled in the durability. Moreover, it is found that the toners of Examples did not cause the fogging in the image after running for a long period, and maintained high image quality over a long period due to their excellent durability. The toners of Comparative Examples, excluding the toners of Comparative Examples 2, 3 and 8 which had a relatively small surface wax amount, tended to cause filming or adhesion to the blade. Moreover, the toners of Comparative Examples 1, 5, 6, 9 and 10 which had a relatively large surface wax amount tended to cause fogging.

All of the toners of Examples and Comparative Examples, other than the toner of Comparative Examples 3 and 8 which had excessively high TA4 (and TA1) and TB4 (and TB1), exhibited sufficient image density and low temperature fixing properties. It is assumed that the toners of Comparative Examples 3 and 8 had insufficient those properties as the binder resin and the like were deteriorated due to excessively high TA4 (and TA1) and TB4 (and TB1).

Moreover, other characteristics will be discussed hereinafter. The toners of Examples 1-3 and 7 had especially low surface wax amounts. Generally speaking, if the surface wax amount is low, excellent charging ability is attained and thus the charging amount tends to be large. It is assumed that the transfer amounts of the toners of Examples 1-3 and 7 were small due to the balance of the charging amount as each condition such as a transfer voltage was fixed. Since these toners also had excellent evaluations related to the fogging, these toners had a margin with respect to the cost reduction and were excellent. For example, the image density can be increased by lowering the charging amount for example by decreasing the addition amount of the polarity controlling agent.

It is assumed that the toners of Comparative Examples 1, 5, 6, 9 and 10 which resulted in low image density caused failures such that the large surface wax amount led a large adhesiveness of the toner which inhibited transferring, and caused filming or adhesion to the blade, the toner was worn out due to the low durability of the toner, or the toner was selectively used for developing.

Although the low fixing properties of the toners of Examples 2, 3 and 7 were evaluated as B due to the low surface wax amounts, these toners were excellent since the evaluations for the filming on the photoconductor and the adhesion to the blade were extremely well and the toners had a margin for providing further low temperature fixing properties by lowering the melting point of the binder resin or the like.

Regarding the adhesion to the blade of Example 7, it is assumed that the adhesion to the blade was occurred since TC1, which was a temperature condition for processing capable of realizing the effects of the present invention, was high, and thus the durability of the toner was lowered due to the deterioration of the binder resin. Moreover, TW tended to be slightly decreased as TC1 was high in Example 7, and thus a part of the wax was deteriorated, or evaporated in the high temperature atmosphere. The same tendencies for decreasing TW were observed in Comparative Example 3 in which TA1 was extremely high and Example 3 in which TA1 was high, though TA1 was a temperature condition for processing capable of realizing the effects of the present invention. It is assumed that the decreased amount of TW was small in Example 6, since the duration for being exposed in the high temperature atmosphere was short compared to the case of Example 3. Although it is assumed that the deterioration of the binder resin was occurred in Example 3, the occurrences of the filming and adhesion to the blade were only slight in Example 3, compared to Comparative Examples, since the surface wax amount was small compared to Comparative Examples and TW was significantly decreased.

As discussed above, the toners of Examples had high durability and excellent properties such that qualities of the prints were not deteriorated after performing a large number of printing, and any machine troubles were occurred.

What is claimed is:

1. A method for producing resinous particles, comprising:
   melting a mixture comprising a binder resin and at least one additive having a melting point which is lower than T1/2 of the binder resin, so as to prepare a molten material, where T1/2 denotes a softening point determined in accordance with a 1/2 method;
   atomizing resinous particles from the molten material in an atmosphere having a temperature which is higher than a glass transition temperature of the binder resin and is lower than 3 times of T1/2 of the binder resin;
   retaining the resinous particles in an atmosphere having a temperature which is higher than the glass transition temperature of the binder resin, and is lower than 1.5 times of T1/2 of the binder resin for 1 second to 15 seconds; and
   cooling and solidifying the resinous particles.

2. The method for producing resinous particles according to claim 1, wherein the atomizing resinous particles comprises supplying the molten material into a chamber having an outlet, and supplying a first gas flow from a means other than a means for supplying the molten material so as to make a contact with the molten material.

3. The method for producing resinous particles according to claim 2, wherein the first gas flow has a temperature ranging from T1/2 of the binder resin or higher to 3 times of T1/2 of the binder resin or lower.

4. The method for producing resinous particles according to claim 2, wherein the chamber has a part which is in the shape of cylinder or corn, the first gas flow forms a circulated flow in the chamber, and an axis of the circulated flow has the same direction as a direction for supplying the molten material in the chamber.

5. The method for producing resinous particles according to claim 2, wherein the first gas flow has the temperature ranging from 150° C. or more to 370° C. or less.

6. The method for producing resinous particles according to claim 2, wherein
   the retaining the resinous particles comprising supplying a second gas flow having a temperature ranging from T1/2 of the binder resin or more to 3 times of T1/2 of the binder resin into the chamber, or
   the cooling and solidifying comprising supplying a third gas flow having a temperature lower than T1/2 of the binder resin into the chamber.

7. The method for producing resinous particles according to claim 6, wherein the second gas flow or the third gas flow is introduced along an inner wall of the chamber.

8. The method for producing resinous particles according to claim 6, wherein the second gas flow or the third gas flow is introduced from a side of the chamber.

9. The method for producing resinous particles according to claim 6, wherein the chamber has a part which is in the shape of cylinder or corn, the second gas flow or the third gas flow forms a circulated flow in the chamber, and an axis of the circulated flow has the same direction as a direction for supplying the molten material in the chamber.

10. The method for producing resinous particles according to claim 6, wherein the second gas flow has a temperature ranging from 120° C. to 350° C.

11. The method for producing resinous particles according to claim 2, wherein a differential pressure between an inner pressure of the chamber and an exterior pressure is in the range of −2 kPa to 2 kPa.

12. The method for producing resinous particles according to claim 2, wherein the unit for supplying the molten material is a mouth ring having an opening which has a length of 0.1 mm to 5.0 mm in a minor axis.

13. The method for producing resinous particles according to claim 12, wherein the mouth ring is a nozzle having an opening in the shape of oval and an opening diameter of 0.16 mm to 1.0 mm.

14. The method for producing resinous particles according to claim 1, wherein the additive comprises at least one selected from the group consisting of wax, a coloring agent, and a charge controlling agent.

15. The method for producing resinous particles according to claim 1, wherein the additive comprises wax, and the resinous particles have a surface wax amount of 0.65% by weight to 4.2% by weight.

* * * * *